US012632612B2

(12) United States Patent
Li et al.

(10) Patent No.: US 12,632,612 B2
(45) Date of Patent: May 19, 2026

(54) DATA PROCESSING METHOD AND RELATED APPARATUS

(71) Applicant: Huawei Technologies Co., Ltd., Shenzhen (CN)

(72) Inventors: Kun Li, Beijing (CN); Yingjun Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 260 days.

(21) Appl. No.: 18/436,711

(22) Filed: Feb. 8, 2024

(65) Prior Publication Data

US 2024/0176914 A1      May 30, 2024

Related U.S. Application Data

(63) Continuation of application No. PCT/CN2022/111387, filed on Aug. 10, 2022.

(30) Foreign Application Priority Data

Aug. 13, 2021      (CN) .......................... 202110931117.1

(51) Int. Cl.
  *G06F 21/78*          (2013.01)
  *G06F 21/54*          (2013.01)
(52) U.S. Cl.
  CPC .............. *G06F 21/78* (2013.01); *G06F 21/54* (2013.01)
(58) Field of Classification Search
  CPC .................................. G06F 21/60; G06F 21/48
  See application file for complete search history.

(56) References Cited

U.S. PATENT DOCUMENTS

| | | | |
|---|---|---|---|
| 2012/0246731 A1* | 9/2012 | Blaisdell | G06F 21/54 |
| | | | 726/26 |
| 2017/0116419 A1* | 4/2017 | Woodward | G06F 21/54 |
| 2020/0133885 A1* | 4/2020 | Tshouva | G06F 21/64 |
| 2020/0374106 A1* | 11/2020 | Padmanabhan | H04L 63/0428 |
| 2021/0209255 A1* | 7/2021 | Immonen | G06F 21/52 |

(Continued)

FOREIGN PATENT DOCUMENTS

WO          2020114937 A1      6/2020

OTHER PUBLICATIONS

Translated Written Opinion for PCT/CN2022/11138, 6 pages, mailing date: Oct. 25, 2022. (Year: 2022).*

(Continued)

*Primary Examiner* — Ponnoreay Pich
(74) *Attorney, Agent, or Firm* — Conley Rose, P.C.

(57) ABSTRACT

A data processing method includes obtaining target constant data to be accessed in first code, where a length of the target constant data is greater than a preset threshold; and inserting a plurality of data transfer instructions into the first code based on a location of an objective function in the first code to obtain second code, where the objective function is a function that needs to access the target constant data, each data transfer instruction of the plurality of data transfer instructions includes a part of data in the target constant data, the plurality of data transfer instructions are used to write the target constant data into a register, and the second code is labeled as being stored into a storage area not having a read permission.

20 Claims, 12 Drawing Sheets

(56)                    References Cited

U.S. PATENT DOCUMENTS

2024/0176914 A1\*    5/2024   Li   .......................... G06F 21/52

OTHER PUBLICATIONS

Spyridoula Gravani et al: IskiOS: Lightweight Defense Against Kernel-Level Code-Reuse Attacks, arxiv.org, Cornell University Library, 201 Olin Library Cornell University Ithaca, NY 14853, Mar. 12, 2019, XP081533378, total 18 pages.
Execute-Only Memory (XOM) for AArch64 binaries, [online], Last uploaded on Nov. 28, 2024, total 8 pages, with english translation.
Scott Brookes et al: "ExOShim: Preventing Memory Disclosure using Execute-Only Kernel Code", International Journal of Information and Computer Security, Jan. 1, 2022, total 11 pages.
Jason Gionta et al: "HideM: Protecting the Contents of Userspace Memory in the Face of Disclosure Vulnerabilities", CODASPY "15: Proceedings of the 5th ACM Conference on Data and Application Security and Privacy, Mar. 2, 2015, total 12 pages.
Marios Pomonis et al: "KR$^\wedge$X: Comprehensive Kernel Protection against Just-In-Time Code Reuse", EuroSys "17: Proceedings of the Twelfth European Conference on Computer Systems, Apr. 23, 2017, total 17 pages.
Y. Chen et al., "NORAX: Enabling Execute-Only Memory for COTS Binaries on AArch64 binaries," 2017 IEEE Symposium on Security and Privacy (SP), San Jose, CA, USA, May 22-26, 2017, pp. 304-319.
Stephen Crane et al: "Readactor: Practical Code Randomization Resilient to Memory Disclosure", 2015 IEEE Symposium on Security and Privacy, May 17-21, 2015, total 18 pages.
Donghyun Kwon et al: "uXOM: Efficient execute-Only Memory on ARM Cortex-M", 28th USENIX Security Symposium, Aug. 14-16, 2019 Santa Clara, CA, USA, total 18 pages.

\* cited by examiner

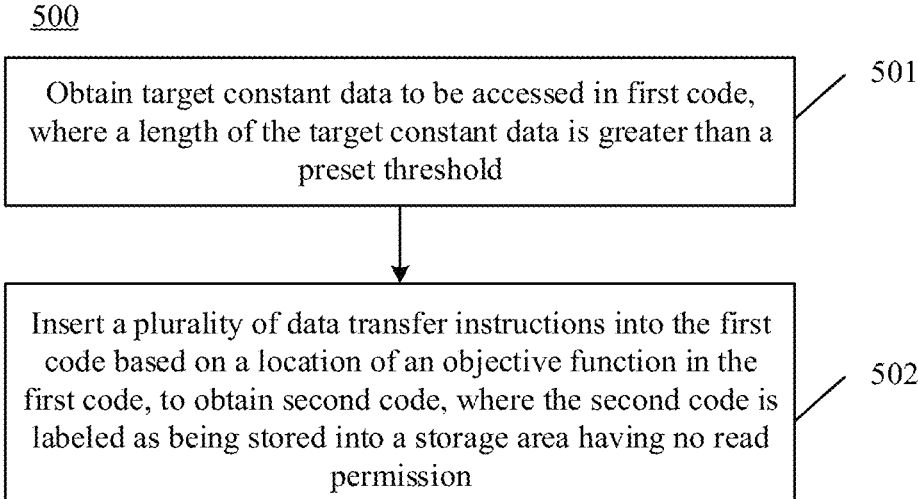

500

Obtain target constant data to be accessed in first code, where a length of the target constant data is greater than a preset threshold    501

Insert a plurality of data transfer instructions into the first code based on a location of an objective function in the first code, to obtain second code, where the second code is labeled as being stored into a storage area having no read permission    502

FIG. 5

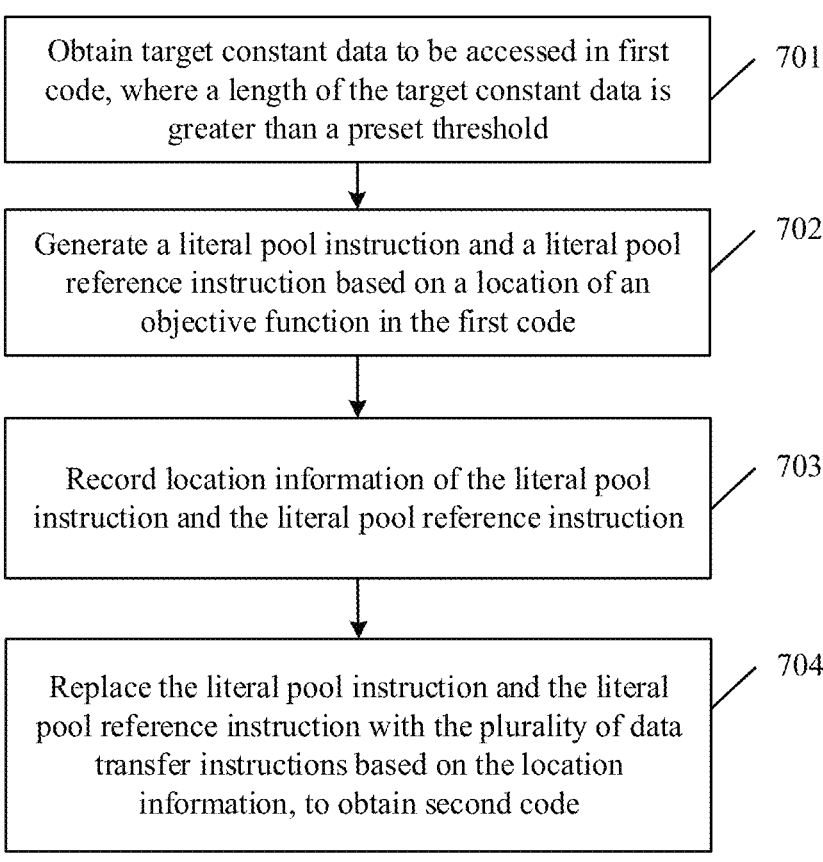

<u>700</u>

Obtain target constant data to be accessed in first code, where a length of the target constant data is greater than a preset threshold — 701

Generate a literal pool instruction and a literal pool reference instruction based on a location of an objective function in the first code — 702

Record location information of the literal pool instruction and the literal pool reference instruction — 703

Replace the literal pool instruction and the literal pool reference instruction with the plurality of data transfer instructions based on the location information, to obtain second code — 704

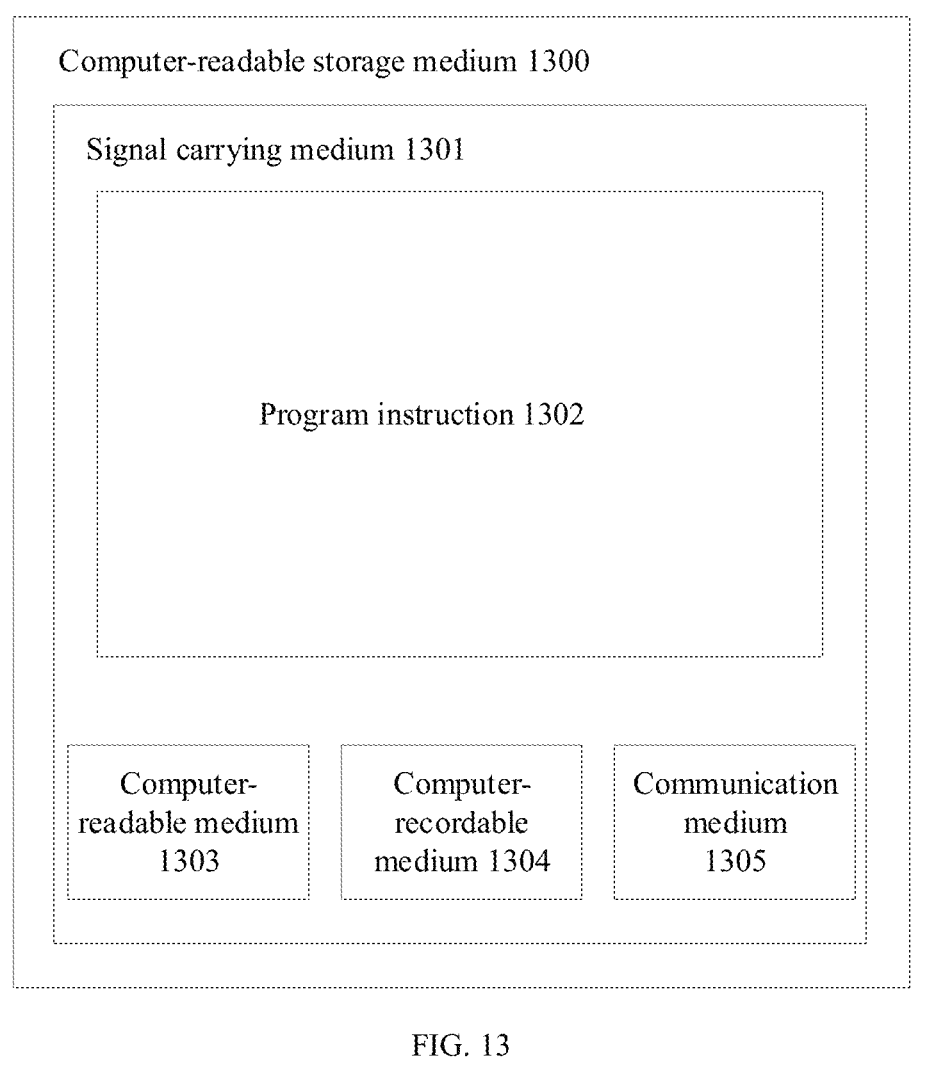

Computer-readable storage medium 1300

Signal carrying medium 1301

Program instruction 1302

Computer-readable medium 1303

Computer-recordable medium 1304

Communication medium 1305

FIG. 13

DATA PROCESSING METHOD AND RELATED APPARATUS

CROSS-REFERENCE TO RELATED APPLICATIONS

This is a continuation of International Patent Application No. PCT/CN2022/111387 filed on Aug. 10, 2022, which claims priority to Chinese Patent Application No. 202110931117.1 filed on Aug. 13, 2021. The disclosures of the aforementioned applications are hereby incorporated by reference in their entireties.

TECHNICAL FIELD

This application relates to the field of computer technologies, and in particular, to a data processing method and a related apparatus.

BACKGROUND

Based on a memory management unit of a processor and memory management of an operating system, a computer system generally supports separation of permissions for different components of an application program. Generally, the application program includes three components: a code segment, a data segment, and a read-only data segment. The three components are located in different address ranges in a memory and are assigned with different permissions by the operating system to ensure security. For example, the code segment is configured to be unwritable such that malicious tampering of program code can be prevented. The read-only data segment is configured to be write-protected such that tampering of read-only data can be prevented. The data segment is configured to be non-executable such that a malicious code injection attack can be prevented.

Currently, a segment of the memory can be forced not to simultaneously have a write permission and an executable permission through the memory management unit or the operating system such that the program code has anti-tampering integrity protection. However, for security protection of the program code, that is, the program code is executable only but not readable, currently there is no universal effective defense technology. However, implementing security protection of the program code is an important means to effectively prevent an attacker from attacking the computer system by reading the program code.

Therefore, to ensure security of the computer system, a method that can implement security protection of the program code is urgently required currently.

SUMMARY

This application provides a data processing method such that security protection of program code can be implemented without affecting normal running of a program, security of a computer system can be effectively ensured, and leakage of key logic of the program code can be avoided.

A first aspect of this application provides a data processing method. The method is used in a process in which an electronic device converts program source code into a program executable file. The method includes that the electronic device obtains target constant data to be accessed in first code, where a length of the target constant data is greater than a preset threshold. The first code may be intermediate code obtained by compiling a program source code file by using a compiler. In the first code, the compiler has not generated a literal pool instruction and a literal pool reference instruction. A value of the literal pool instruction is constant data (that is, a literal pool) that needs to be accessed in a literal pool manner. The literal pool reference instruction is used to access the value of the literal pool instruction, that is, instructs to access the literal pool. The target constant data is the constant data that needs to be accessed in the literal pool manner in a conventional compilation process.

Then, the electronic device inserts a plurality of data transfer instructions into the first code based on a location of the objective function in the first code to obtain second code.

The objective function is a function that needs to access the target constant data. Each data transfer instruction in the plurality of data transfer instructions includes a part of data in the target constant data, and the plurality of data transfer instructions are used to write the target constant data into a register. Further, each data transfer instruction in the plurality of data transfer instructions is used to write data carried in the data transfer instruction into the register. For example, the plurality of data transfer instructions may all be move instructions. Because each data transfer instruction in the plurality of data transfer instructions carries a part of data in the target constant data, after the plurality of data transfer instructions are sequentially executed, each data transfer instruction writes the part of data carried in the data transfer instruction into the register such that the register can finally store the target constant data.

In addition, the electronic device labels the second code obtained through insertion of the plurality of data transfer instructions as being stored into a storage area having no read permission. The second code is labeled as being stored into the storage area having no read permission such that an attacker can be prevented from maliciously reading the program code, security of a computer system can be effectively ensured, and leakage of key logic of the program code can be avoided.

In a possible implementation, the plurality of data transfer instructions include a first data transfer instruction and a second data transfer instruction, the first data transfer instruction includes a first part of data in the target constant data, the first data transfer instruction is used to write the first part of data into the register, the second data transfer instruction includes a second part of data in the target constant data, the second data transfer instruction is used to write the second part of data into the register, and the first part of data and the second part of data do not coincide.

In this solution, parts of data in the target constant data are carried by the consecutive first data transfer instruction and second data transfer instruction respectively. In this way, when sequentially executing the first data transfer instruction and the second data transfer instruction, the electronic device may first write the first part of data into the register, and then write the second part of data into the register such that the register stores complete target constant data, thereby ensuring normal running of the program.

In a possible implementation, the target constant data to be accessed in the first code may be floating-point data. In the computer system, when processing a floating-point number, a processor usually needs to write the floating-point number from a memory into a dedicated register, that is, write the floating-point number into a floating-point register.

Therefore, to ensure that the floating-point number can be written into the floating-point register, the method further includes: if the target constant data is floating-point data, inserting a third data transfer instruction into the first code. The third data transfer instruction is located after the plurality of data transfer instructions, the plurality of data transfer instructions is used to write the target constant data into a general-purpose register, and the third data transfer instruction is used to write the target constant data written into the general-purpose register into a floating-point register.

The third data transfer instruction that instructs to write the target constant data of the general-purpose register into the floating-point register is inserted after the plurality of data transfer instructions such that it can be ensured that the floating-point number to be accessed in the first code can be normally written into the floating-point register, thereby ensuring normal running of the program.

In a possible implementation, the inserting a plurality of data transfer instructions into the first code includes: if the target constant data is address type data, inserting the plurality of data transfer instructions into the first code, and adding a label to the plurality of data transfer instructions, where the label indicates that data transferred by the plurality of data transfer instructions is the address type data. Relocation information is generated based on the label, where the relocation information indicates locations of the plurality of data transfer instructions in the first code. The part of data in the target constant data is filled in each of the plurality of data transfer instructions based on the relocation information.

The inserting a plurality of data transfer instructions into the first code is executed by the compiler in the electronic device in a compilation phase. However, when the target constant data is the address type data, a value of the target constant data (that is, a target address) can be determined only in a link phase. To be specific, the compiler cannot obtain the value of the target constant data in the compilation phase. In this case, the compiler may insert the plurality of data transfer instructions into the first code. The data transfer instruction does not carry a specific value of the target constant data.

In an assembly phase, an assembler generates the relocation information based on the label generated by the compiler. The relocation information indicates locations of the plurality of data transfer instructions in code of an object file, where the object file is obtained by compiling the first code by using the compiler. Further, the relocation information records location information, and the location information indicates a location of address data that cannot be determined in the program code in a current phase. Generally, the relocation information further records relocation types, and different relocation types correspond to different types of address information and addressing modes.

In the link phase, a linker may determine the value of the target constant data based on the relocation information generated by the assembler, that is, determine address data that needs to be filled in the plurality of data transfer instructions. Then, the linker fills the part of data in the target constant data into each of the plurality of data transfer instructions based on the location indicated in the relocation information.

In this solution, the label is added to the plurality of data transfer instructions, and the corresponding relocation information is generated such that correct address data can be filled in the plurality of data transfer instructions based on the relocation information in the link phase, thereby ensuring that valid program code can also be generated when the target constant data is the address data.

In a possible implementation, inserting a plurality of data transfer instructions into the first code based on a location of the objective function in the first code includes generating a literal pool instruction and a literal pool reference instruction based on the location of the objective function in the first code, where the literal pool instruction includes the target constant data, and the literal pool reference instruction is used to access the target constant data in the literal pool instruction; recording location information of the literal pool instruction and the literal pool reference instruction; and replacing the literal pool instruction and the literal pool reference instruction with the plurality of data transfer instructions based on the location information.

In this solution, the literal pool instruction and the literal pool reference instruction are first generated, locations of the literal pool instruction and the literal pool reference instruction are recorded, and finally the literal pool instruction and the literal pool reference instruction are replaced with equivalent data transfer instructions. The target constant data can be written into the register through execution of the data transfer instructions, and the program code does not need to be read. Therefore, the finally obtained program code may be labeled as being stored into the storage area having no read permission such as to prevent the attacker from maliciously reading the program code, thereby effectively ensuring security of the computer system, and avoiding leakage of key logic of the program code.

In a possible implementation, before the recording location information of the literal pool instruction and the literal pool reference instruction, the method further includes: adjusting a location of the literal pool instruction in the first code such that the literal pool instruction is located after the literal pool reference instruction.

After the location of the literal pool instruction is adjusted, the literal pool reference instruction and the literal pool instruction are two consecutive instructions in the first code.

In a possible implementation, the target constant data includes one or more of an integer constant, a floating-point constant, an address of a static symbol, an address of a global symbol, and an address of a thread local storage symbol.

A second aspect of this application provides a data processing method, including generating a first function based on target constant data to be accessed in first code, where a length of the target constant data is greater than a preset threshold, the target constant data is constant data that needs to be accessed in a literal pool manner in a conventional compilation process, and the first function includes the target constant data; and inserting a call instruction and an access instruction into the first code based on a location of a second function in the first code, to obtain second code.

The second function is a function that needs to access the target constant data, the call instruction instructs to call the first function, the first function is used to return an address of the target constant data, the access instruction instructs to access the target constant data based on the address returned by the first function, the second code is labeled as being stored into a storage area having no read permission, and the first function is labeled as being stored into a storage area having the read permission.

In this solution, the call instruction of the function including the target constant data is inserted into the code, and the function including the target constant data is stored in a separate program segment such that a finally generated program code segment does not include specific constant data. Therefore, the finally generated program code segment may be stored into the storage area having no read permission such as to prevent the attacker from maliciously reading the program code, thereby effectively ensuring security of the computer system, and avoiding leakage of key logic of the program code.

In a possible implementation, the first function is used to return a base address of the target constant data, the access instruction includes an address offset, and the access instruction instructs to access the target constant data based on the base address and the address offset.

In a possible implementation, an executable file is generated based on the second code and the first function, the second code is located in a first program segment of the executable file, the first function is located in a second program segment of the executable file, a running permission of the first program segment does not include the read permission, and a running permission of the second program segment includes the read permission.

In a possible implementation, the target constant data includes one or more of an integer constant, a floating-point constant, an address of a static symbol, an address of a global symbol, and an address of a thread local storage symbol.

A third aspect of this application provides an electronic device, including an obtaining unit and a processing unit. The obtaining unit is configured to obtain target constant data to be accessed in first code, where a length of the target constant data is greater than a preset threshold. The processing unit is configured to insert a plurality of data transfer instructions into the first code based on a location of the objective function in the first code, to obtain second code, where the objective function is a function that needs to access the target constant data, each data transfer instruction of the plurality of data transfer instructions includes a part of data in the target constant data, the plurality of data transfer instructions are used to write the target constant data into a register, and the second code is labeled as being stored into a storage area having no read permission.

In a possible implementation, the plurality of data transfer instructions include a first data transfer instruction and a second data transfer instruction, the first data transfer instruction includes a first part of data in the target constant data, the first data transfer instruction is used to write the first part of data into the register, the second data transfer instruction includes a second part of data in the target constant data, the second data transfer instruction is used to write the second part of data into the register, and the first part of data and the second part of data do not coincide.

In a possible implementation, the processing unit is further configured to: if the target constant data is floating-point data, insert a third data transfer instruction into the first code, where the third data transfer instruction is located after the plurality of data transfer instructions, the plurality of data transfer instructions are used to write the target constant data into a general-purpose register, and the third data transfer instruction is used to write the target constant data written into the general-purpose register into a floating-point register.

In a possible implementation, the processing unit is further configured to: if the target constant data is address type data, insert the plurality of data transfer instructions into the first code, and add a label to the plurality of data transfer instructions, where the label indicates that data transferred by the plurality of data transfer instructions is the address type data. The processing unit is further configured to generate relocation information based on the label, where the relocation information indicates locations of the plurality of data transfer instructions in the first code. The processing unit is further configured to fill, in each of the plurality of data transfer instructions, the part of data in the target constant data based on the relocation information.

In a possible implementation, the processing unit is further configured to generate a literal pool instruction and a literal pool reference instruction based on the location of the objective function in the first code, where the literal pool instruction includes the target constant data, and the literal pool reference instruction is used to access the target constant data in the literal pool instruction. The processing unit is further configured to record location information of the literal pool instruction and the literal pool reference instruction. The processing unit is further configured to replace the literal pool instruction and the literal pool reference instruction with the plurality of data transfer instructions based on the location information.

In a possible implementation, the processing unit is further configured to adjust a location of the literal pool instruction in the first code such that the literal pool instruction is located after the literal pool reference instruction.

In a possible implementation, the target constant data includes one or more of an integer constant, a floating-point constant, an address of a static symbol, an address of a global symbol, and an address of a thread local storage symbol.

A fourth aspect of this application provides an electronic device including a generation unit and a processing unit. The generation unit is configured to generate a first function based on target constant data to be accessed in first code, where a length of the target constant data is greater than a preset threshold, and the first function includes the target constant data. The processing unit is configured to insert a call instruction and an access instruction into the first code based on a location of a second function in the first code, to obtain second code, where the second function is a function that needs to access the target constant data, the call instruction instructs to call the first function, the first function is used to return an address of the target constant data, the access instruction instructs to access the target constant data based on the address returned by the first function, the second code is labeled as being stored into a storage area having no read permission, and the first function is labeled as being stored into a storage area having the read permission.

In a possible implementation, the first function is used to return a base address of the target constant data, the access instruction includes an address offset, and the access instruction instructs to access the target constant data based on the base address and the address offset.

In a possible implementation, the processing unit is further configured to generate an executable file based on the second code and the first function, where the second code is located in a first program segment of the executable file, the first function is located in a second program segment of the executable file, a running permission of the first program segment does not include the read permission, and a running permission of the second program segment includes the read permission.

In a possible implementation, the target constant data includes one or more of an integer constant, a floating-point constant, an address of a static symbol, an address of a global symbol, and an address of a thread local storage symbol.

A fifth aspect of this application provides an electronic device, where the electronic device includes a memory and a processor, the memory stores code, the processor is configured to execute the code, and when the code is executed, the electronic device performs the method according to any one of the implementations of the first aspect or the second aspect.

A sixth aspect of this application provides a computer-readable storage medium, where the computer-readable storage medium stores a computer program, and when the computer program is run on a computer, the computer is enabled to perform the method according to any one of the implementations of the first aspect or the second aspect.

A seventh aspect of this application provides a computer program product, where when the computer program product is run on a computer, the computer is enabled to perform the method according to any one of the implementations of the first aspect or the second aspect.

An eighth aspect of this application provides a chip, including one or more processors. Some or all of the processors are configured to read and execute computer programs stored in a memory, to perform the method in any possible implementation of any one of the foregoing aspects.

Optionally, the chip includes the memory, and the memory and the processor are connected through a circuit or a wire. Optionally, the chip further includes a communication interface, and the processor is connected to the communication interface. The communication interface is configured to receive data and/or information that needs to be processed. The processor obtains the data and/or the information from the communication interface, processes the data and/or the information, and outputs a processing result through the communication interface. The communication interface may be an input/output interface. The method provided in embodiments of this application may be implemented by one chip, or may be cooperatively implemented by a plurality of chips.

BRIEF DESCRIPTION OF DRAWINGS

FIG. 5 is a schematic flowchart of a data processing method 500 according to an embodiment of this application;

FIG. 7 is a schematic flowchart of a data processing method 700 according to an embodiment of this application;

FIG. 13 is a schematic diagram of a structure of a computer-readable storage medium 1300 according to an embodiment of this application.

DESCRIPTION OF EMBODIMENTS

The following describes embodiments of this application with reference to the accompanying drawings. A person of ordinary skill in the art may learn that, with development of technologies and emergence of new scenarios, the technical solutions provided in embodiments of this application are also applicable to similar technical problems.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in the description of embodiments of this application. In addition, the terms "include", "have" and any other variants mean to cover the non-exclusive inclusion such that a process, method, system, product, or device that includes a series of units is not necessarily limited to those units, but may include other units not expressly listed or inherent to such a process, method, product, or device.

For ease of understanding, the following first describes technical terms and related concepts in embodiments of this application.

Execute-only memory (XOM): a security defense technology. A memory storing a code segment is executable only but not readable, to prevent a dynamic reverse attack by a hacker and information leakage of key code logic.

Literal pool: constant data generated by a compiler and embedded in program code. The literal pool is also usually referred to as a literal constant.

Memory management unit (MMU): a virtual memory management unit of a central processing unit (CPU), responsible for mapping a virtual memory to a physical memory and designating access permissions (such as a read permission, a write permission, and an execution permission) of a virtual memory page.

Program counter (PC): a register configured to store an address of a next instruction to be executed by a processor.

Constant data: data whose value remains unchanged during the entire operation. Generally, a value of the constant data may be directly given in a program or instructions.

Generally, an application program includes program segments such as a program code segment, a data segment, and a read-only data segment, and the program code segment includes a plurality of consecutive instructions. In an execution process of the application program, the operating system loads the program segments of the application programs into a memory, and then the processor sequentially executes the instructions in the program code segment based on a specific sequence such as to execute the application program.

Figure 1:
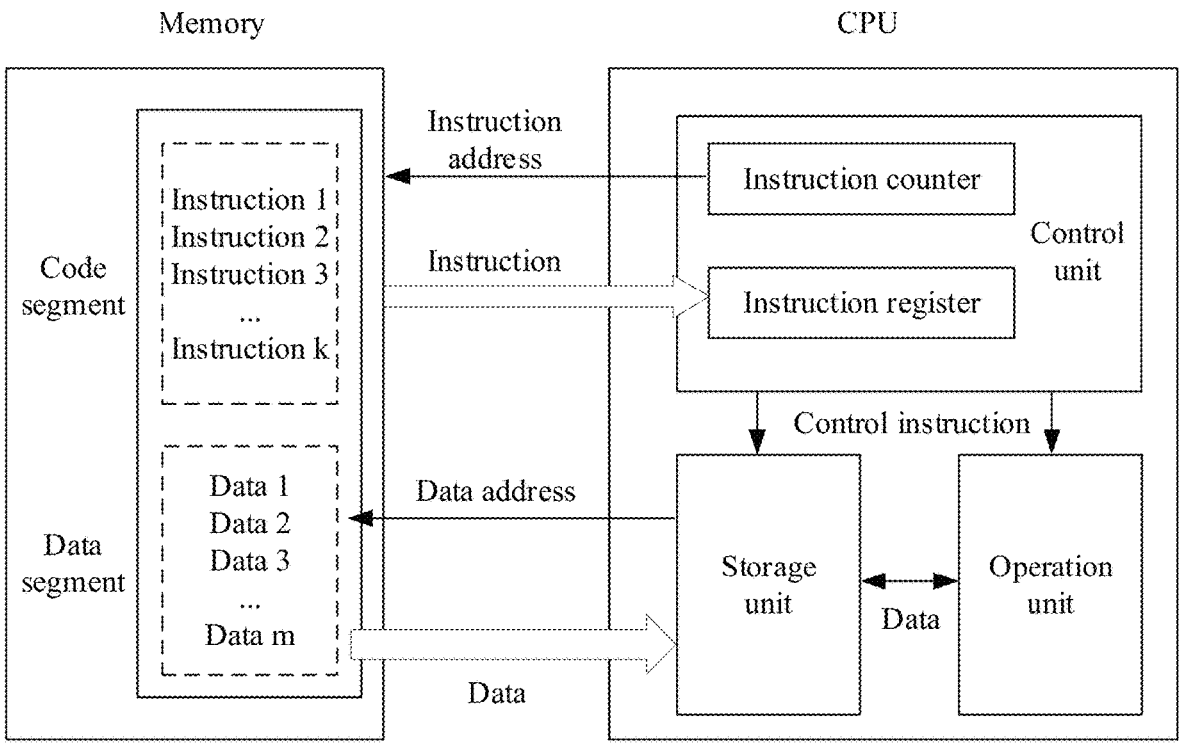
FIG. 1 is a schematic diagram of executing an application program by a processor according to an embodiment of this application.

FIG. 1 is a schematic diagram of executing an application program by a processor according to an embodiment of this application. As shown in FIG. 1, the processor usually includes a control unit, a storage unit, and an operation unit. The control unit includes an instruction counter and an instruction register. The instruction counter is configured to store an address of a next to-be-executed instruction in a memory, and the instruction register is configured to store the to-be-executed instruction. The storage unit usually includes a plurality of registers, for example, a general-purpose register and a floating-point register. The register in the storage unit is usually configured to store data that needs to be used during instruction execution. The operation unit is configured to process data according to a currently executed instruction.

Based on the foregoing structure, a running principle of the processor is as follows: The control unit sends, under the action of a time sequence pulse, an instruction address (that is, an address of an instruction in the memory) pointed to by the instruction counter to an address bus (not shown in FIG. 1), and then the processor reads an instruction in the instruction address to the instruction register for decoding. For data that needs to be used in an instruction execution process, the processor sends a data address corresponding to the data to the address bus, and reads, based on the data address, the data to a storage unit in the processor for temporary storage. Finally, the operation unit in the processor processes the data according to the currently executed instruction. In general, the processor fetches instructions and corresponding data from the memory one by one, and performs operation processing on the data based on operation code in the instructions until program execution is completed.

Further, a working process of the processor may be divided into five phases: instruction fetching, instruction decoding, instruction execution, memory access and operand reading, and result writeback.

1. Instruction Fetching (IF) Phase.

The instruction fetching phase is a process of fetching an instruction from the memory to the instruction register. A value in the instruction counter indicates a location of a next to-be-executed instruction in the memory. After an instruction is fetched, the value in the instruction counter automatically increases based on a length of the instruction.

2. Instruction Decoding (ID) Phase.

After the instruction is fetched, the processor immediately enters the instruction decoding phase. In the instruction decoding phase, an instruction decoder splits and interprets the fetched instruction based on a predetermined instruction format, and identifies and distinguishes between different instruction types and various methods for obtaining operands.

3. Instruction Execution (EX) Phase.

After the instruction fetching phase and the instruction decoding phase, the processor enters the instruction execution phase. A task in the instruction execution phase is to complete various operations specified by the instruction to implement functions of the instruction. Therefore, different parts of the processor are connected to perform required operations. For example, if an addition operation is required, an arithmetic logic unit in the operation unit will be connected to a group of inputs and a group of outputs. The inputs provide values that need to be added, and the outputs include final operation results.

4. Memory Access and Operand Reading (MEM) Phase.

In the instruction execution process, based on an instruction requirement, the processor may need to access the memory to read an operand. In this case, the processor enters the memory access and operand reading phase. A task in the memory access and operand reading phase is: The processor obtains an address of an operand in the memory based on instruction address code, and reads the operand from the memory for operation.

5. Result Writeback (WB) Phase.

As the last phase, in the result writeback phase, running result data in the instruction execution phase is written back into a storage structure. For example, the result data is usually written into an internal register of the processor such that the result data can be quickly accessed by a subsequent instruction. In some cases, the result data may alternatively be written into a relatively slow, inexpensive, and large-capacity memory.

After instruction execution is completed and the result data is written back, the processor obtains an address of a next instruction from the instruction counter, and starts a new cycle. The next instruction is fetched in order in a next instruction cycle.

Because the processor has the clear instruction fetching phase and the clear memory access and operand reading phase, when a memory area is configured to be executable only but not readable, the processor can execute only the instruction fetching phase from the memory area, but cannot execute the memory access and operand reading phase. To be specific, the processor can only obtain an instruction for execution from the memory area, and cannot read data in the memory area.

The foregoing describes technical terms and related technical concepts in embodiments of this application. The following describes reasons why the data processing method in embodiments of this application is proposed.

In a computer system, a typical procedure of running an application program is: parsing, by an operating system, an executable file of the application program, and allocating a corresponding memory based on a size of a program segment in the executable file. Further, the operating system loads program segments such as a program code segment, a data segment, and a read-only data segment in the executable file from the executable file to different memory segments respectively, and configures different running permissions for the different memory segments based on running permissions designated for the different program segments in the executable file. When the XOM technology is not enabled, a default configuration permission of a memory in which the program code segment is located is a readable permission and an executable permission. When the memory in which the program code segment is located has the readable permission and the executable permission, the computer system is vulnerable to an attack by an attacker.

Further, in a conventional memory security attack procedure, a hacker first reads attacked program code, searches the program code for available code snippets, and then uses these code snippets to execute malicious behaviors controlled by the attacker. In this case, security of the computer system is endangered.

In addition, the attacker may directly read key algorithms in the program code, to steal code logic, causing leakage of key algorithm code. For example, implementation logic of a key algorithm library such as artificial intelligence or image processing is usually included inside the program code segment. The attacker can obtain the implementation logic of a key algorithm by reading content of the program code segment, causing leakage of the key algorithm.

It can be learned from the foregoing that, implementing an XOM security feature can effectively prevent the attacker from executing a memory attack and avoid leakage of key algorithm logic. Therefore, implementing the XOM security feature is an important means to improve security of the computer system.

Further, a necessary prerequisite for implementing the XOM security feature is that the computer system supports configuring, in a manner, a running permission of the program code segment to be executable but not readable.

However, through research, the applicant finds that a technical difficulty that hinders the computer system from implementing the XOM security feature is a literal pool mechanism of a compiler. A literal pool is constant data that is generated by the compiler in a process of compiling the program code and that is embedded in the code. The constant data is necessary for a program to perform normal functions (such as constant storage, data addressing, and code jumping), and the constant data needs to be read by the program code in a normal running process.

Therefore, the literal pool mechanism is contradictory with the XOM security feature. To be specific, the XOM security feature means that the program code segment is unreadable, but the literal pool is embedded in the program code segment, and reading the literal pool during program running is equivalent to reading the code segment. Therefore, when the program code is obtained through compilation by the compiler based on the literal pool mechanism, implementing the XOM security feature in the computer system may cause execution crash of the program due to a permission error during program running.

Currently, the literal pool mechanism is widely used in a mainstream compiler. A program code segment in a mainstream processor architecture such as an advanced reduced instruction set computer (RISC) machine (ARM) generally includes the literal pool, making it difficult to implement the XOM security feature. Therefore, removing the literal pool embedded in the program code segment in a manner is a core problem for implementing the XOM security feature.

In view of this, embodiments of this application provide a data processing method. An existing program construction process is improved such that a finally generated program code segment does not include the literal pool, and the permission of the program code segment is designated to be executable only to implement security protection of the program code.

Figure 2:
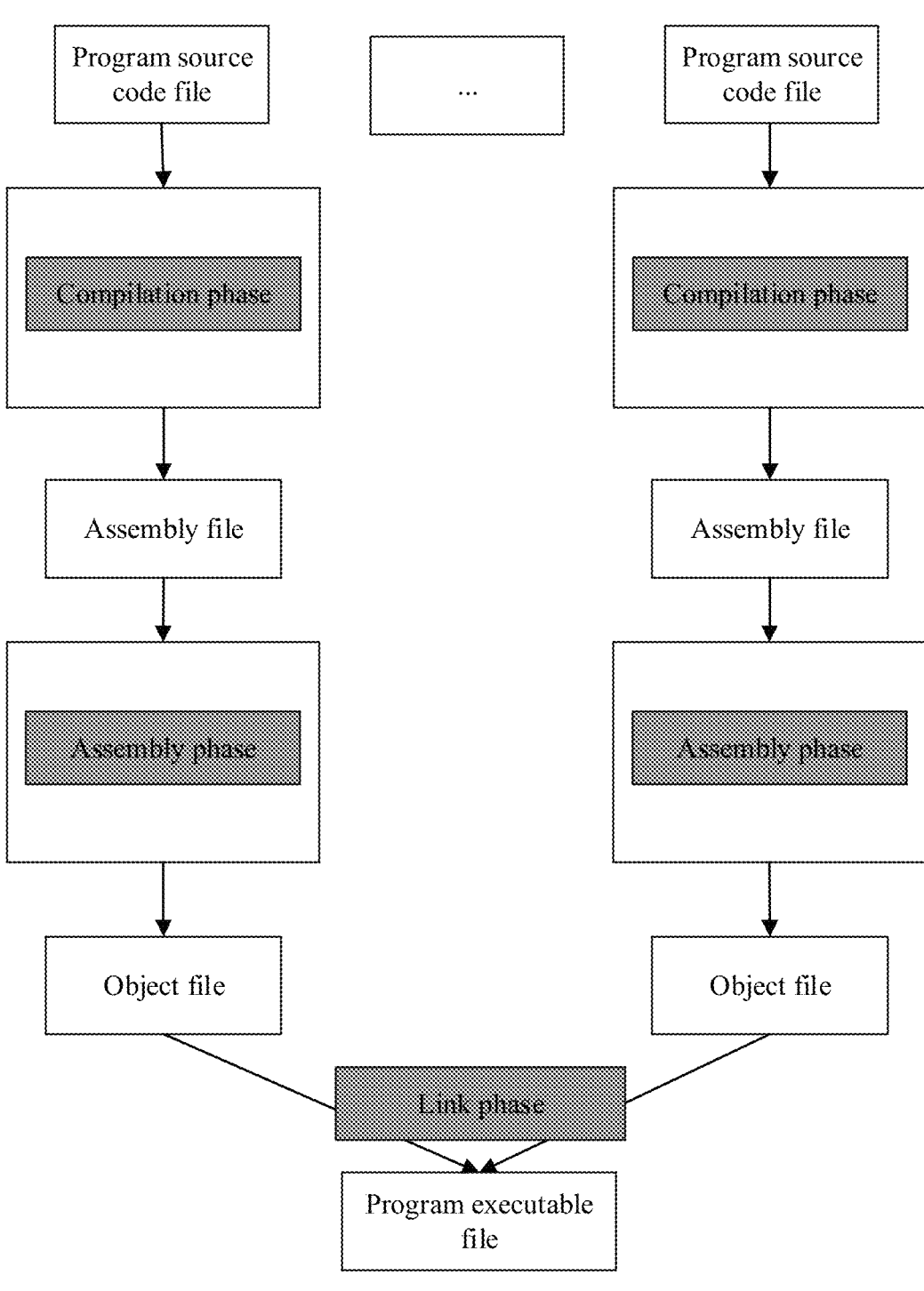
FIG. 2 is a schematic flowchart of program construction according to this application.

FIG. 2 is a schematic flowchart of program construction according to this application. Generally, a program construction process includes compilation, assembly, and link. A program usually includes a plurality of source code files. In a compilation phase, a compiler compiles each source code file in the program, to generate a plurality of assembly files. The assembly file is a back-end code file (.s program file) that is of a specific processor architecture and that is generated through compilation. Assembly code in the assembly file is rendered as readable text.

In the assembly phase, an assembler assembles each assembly file, and generates a plurality of object files. The object file (.o file) is a binary file that is of the specific processor architecture and that is converted from the assembly file after the assembly file is assembled by the assembler.

In the link phase, a linker links all object files corresponding to program source code files, to generate a program executable file, thereby completing program construction. In addition, the linker may designate different running permissions for different program segments in the program executable file. Permission information in the executable file will guide, when an operating system loads and boots the program executable file, the operating system to configure different permissions for different memory segments that store different program segments.

In the data processing method provided in embodiments of this application, a plurality of phases in the existing program construction process may be improved such that a code segment in a finally generated program executable file does not include the literal pool. For example, the compilation phase and the link phase are improved, or the compilation phase, the assembly phase, and the link phase are all improved.

Figure 3:
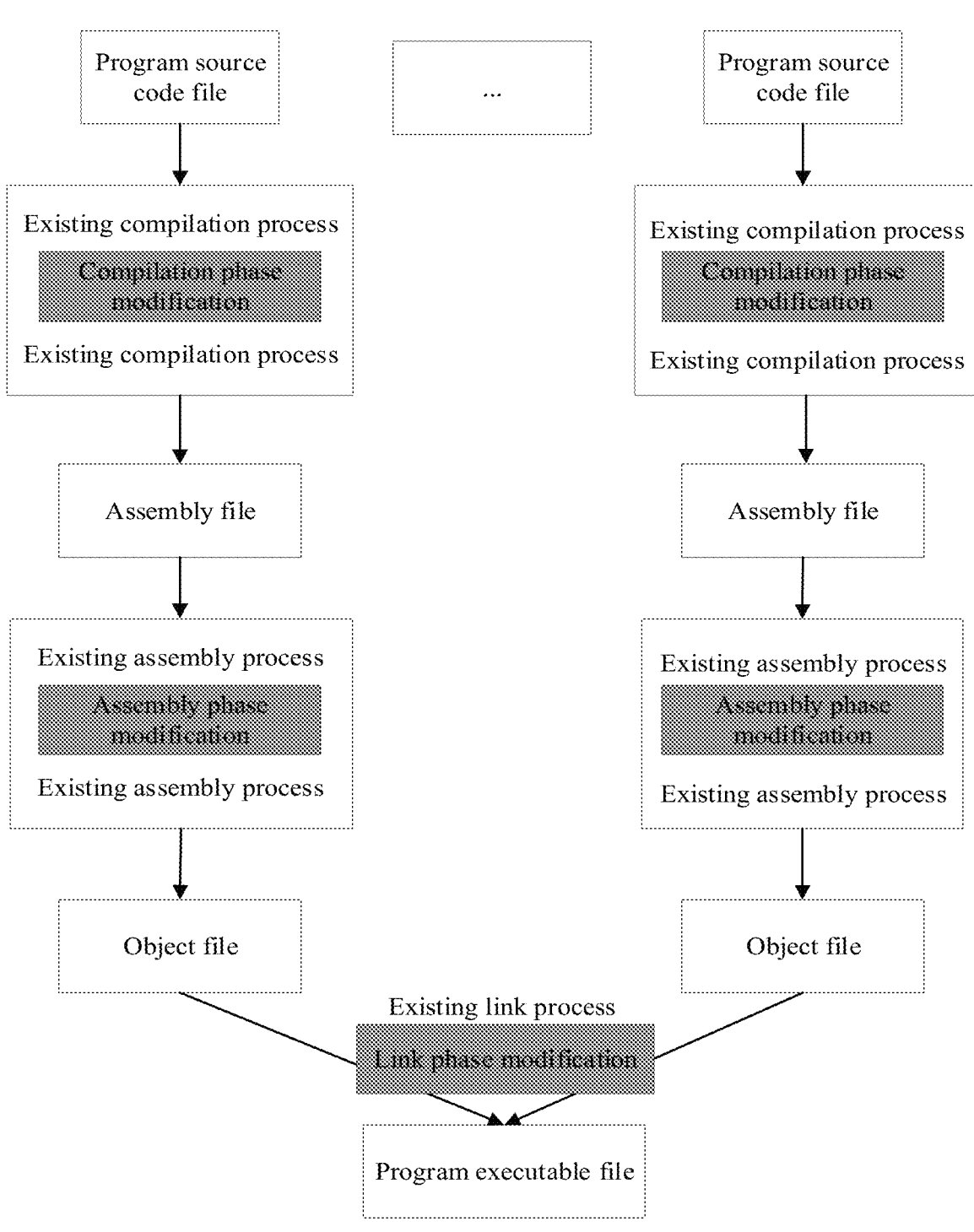
FIG. 3 is a schematic flowchart of an improved program construction process according to an embodiment of this application.

For example, FIG. 3 is a schematic flowchart of an improved program construction process according to an embodiment of this application. As shown in FIG. 3, based on the data processing method provided in embodiments of this application, the compilation phase, the assembly phase, and the link phase in the existing program construction process are all improved such that the code segment in the finally generated program executable file does not include the literal pool. In addition, a permission of the program code segment is designated to be executable only, to implement security protection of the program code.

The foregoing describes a scenario to which the method provided in embodiments of this application is applied. The following will describe a device to which the method provided in embodiments of this application is applied.

Further, the data processing method provided in embodiments of this application may be used on an electronic device. For example, the electronic device may be, for example, a server, a smartphone (mobile phone), a personal computer (PC), a notebook computer, a tablet computer, a smart television, a mobile internet device (MID), a wearable device, a virtual reality (VR) device, an augmented reality (AR) device, a wireless electronic device in industrial control, a wireless electronic device in self driving, a wireless electronic device in remote medical surgery, a wireless electronic device in a smart grid, a wireless electronic device in transportation safety, a wireless electronic device in a smart city, or a wireless electronic device in a smart home. For ease of description, the following will describe the method provided in embodiments of this application by using an example in which the method provided in embodiments of this application is used on a server.

Figure 4:
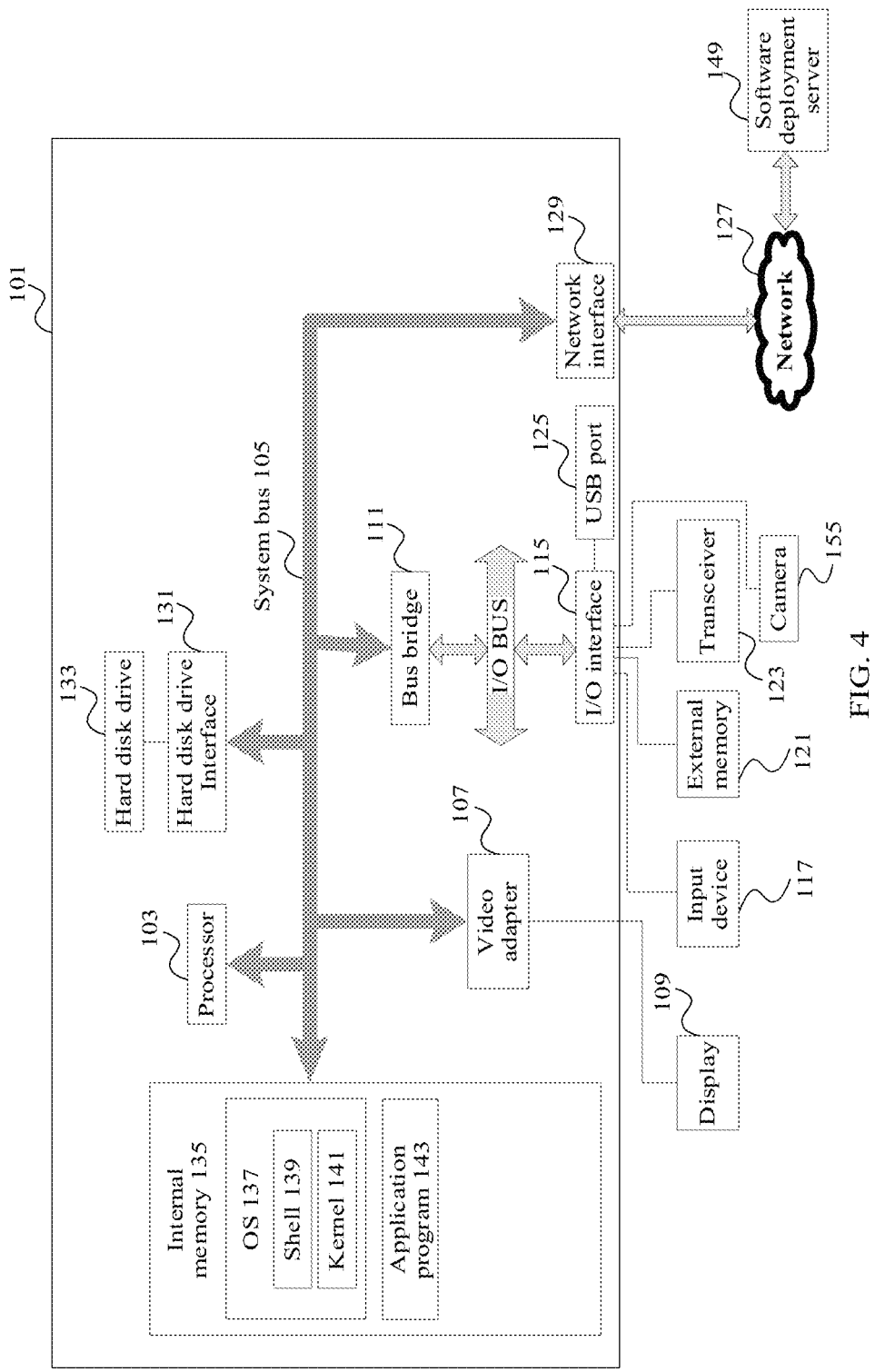
FIG. 4 is a schematic diagram of a structure of an electronic device 101 according to an embodiment of this application.

FIG. 4 is a schematic diagram of a structure of an electronic device 101 provided in an embodiment of this application. As shown in FIG. 4, the electronic device 101 includes a processor 103, and the processor 103 is coupled to a system bus 105. There may be one or more processors 103, and each processor may include one or more processor cores. A video adapter 107 is further included, and the video adapter may drive a display 109. The display 109 is coupled to the system bus 105. The system bus 105 is coupled to an input/output (I/O) bus through a bus bridge 111. An I/O interface 115 is coupled to the I/O bus. The I/O interface 115 communicates with a plurality of I/O devices, such as an input device 117 (for example, a touchscreen), an external memory 121 (for example, a hard disk, a floppy disk, an optical disc, or a Universal Serial Bus (USB) flash drive), a multimedia interface, a transceiver 123 (which may send and/or receive a radio communication signal), a camera 155 (which may capture static and dynamic digital video images), and an external USB port 125. Optionally, an interface connected to the I/O interface 115 may be a USB interface.

The processor 103 may be any conventional processor, including a RISC processor, a complex instruction set computing (CISC) processor, or a combination thereof. Optionally, the processor may be a dedicated apparatus such as an ASIC.

The electronic device 101 may communicate with a software deployment server 149 through a network interface 129. For example, the network interface 129 is a hardware network interface, for example, a network adapter. A network 127 may be an external network, for example, the internet, or may be an internal network, for example, the Ethernet or a virtual private network (VPN). Optionally, the network 127 may alternatively be a wireless network, for example, a Wi-Fi network or a cellular network.

A hard disk drive interface 131 is coupled to the system bus 105. A hardware drive interface is connected to a hard disk drive 133. An internal memory 135 is coupled to the system bus 105. Data run in the internal memory 135 may include an operating system (OS) 137, an application program 143, and a scheduling table of the electronic device 101.

The processor 103 may communicate with the internal memory 135 by using the system bus 105, and extract instructions and data in the application program 143 from the internal memory 135 such as to execute the program.

The operating system includes a shell 139 and a kernel 141. The shell 139 is an interface between a user and a kernel of the operating system. The shell is an outermost layer of the operating system. The shell manages interaction between the user and the operating system. To be specific, the shell waits for an input from the user, interprets the input from the user to the operating system, and processes various output results of the operating system.

The kernel 141 includes parts of the operating system that are configured to manage a memory, a file, a peripheral device, and system resources. The kernel 141 directly interacts with hardware. The kernel of the operating system usually runs processes, provides communication between the processes, and provides CPU time slice management, interruption, memory management, I/O management, and the like.

For example, when the electronic device 101 is the smartphone, the application program 143 includes a program related to instant messaging. In an embodiment, when the application program 143 needs to be executed, the electronic device 101 may download the application program 143 from the software deployment server 149.

FIG. 5 is a schematic flowchart of a data processing method 500 according to an embodiment of this application. As shown in FIG. 5, the data processing method 500 includes the following steps 501 and 502.

Step 501: Obtain target constant data to be accessed in first code, where a length of the target constant data is greater than a preset threshold.

In this embodiment, the first code may be intermediate code obtained by compiling a program source code file by using a compiler. In the first code, the compiler has not generated a literal pool instruction and a literal pool reference instruction. A value of the literal pool instruction is constant data (that is, the literal pool) that needs to be accessed in a literal pool manner. The literal pool reference instruction is used to access the value of the literal pool instruction, that is, instruct to access the literal pool.

Further, the first code generated by the compiler includes one or more functions, and some of the one or more functions need to access the constant data during execution. Therefore, the target constant data to be accessed in the first code, that is, the target constant data that needs to be accessed by a function in the first code may be determined through instruction scanning on the first code. The target constant data is the constant data that needs to be accessed in the literal pool manner in a conventional compilation process.

Generally, because a length of an instruction in program code is fixed, when a piece of constant data having a relatively long length needs to be used in an instruction, the compiler allocates a memory in the code, and stores the constant data having the relatively long length in the allocated memory. To be specific, the compiler generates a literal pool instruction. Then, the compiler uses an instruction in the code to load the constant data stored in the memory to a register for operation. To be specific, the compiler generates a literal pool reference instruction.

For example, in an ARM instruction set, a length of an ARM instruction is fixed to four bytes. Therefore, the compiler cannot encode constant data with a length of fourth bytes into a compiled instruction. In this case, the compiler generates the literal pool instruction and the literal pool reference instruction. The literal pool instruction includes the four-byte constant data, and the literal pool reference instruction instructs to access the constant data in the literal pool instruction. For another example, a length of a Thumb instruction is fixed to two bytes, and the compiler cannot encode constant data with a length of two bytes into a compiled instruction.

To be specific, when the length of constant data that needs to be accessed is greater than a specific value, the compiler generates the corresponding literal pool instruction and corresponding literal pool reference instruction for the constant data. Therefore, in a process of performing instruction scanning on the first code, the compiler may determine constant data whose length is greater than the preset threshold as the target constant data. That is, the length of the target constant data is greater than the preset threshold, and the preset threshold may be a value such as two bytes or four bytes. The value of the preset threshold may be determined based on an actual compilation requirement. A specific value of the preset threshold is not limited in this embodiment.

In addition, in some cases, the compiler may alternatively determine, in some other manners, constant data that is in intermediate code and that needs to be accessed in the literal pool manner. Therefore, in this embodiment, the compiler may alternatively determine the target constant data in the first code in another manner, to ensure that the target constant data determined by the compiler is the constant data that needs to be accessed in the literal pool manner in the conventional compilation process.

Optionally, the target constant data in the first code may include one or more of an integer constant, a floating-point constant, an address of a static symbol, an address of a global symbol, and an address of a thread local storage symbol. In other words, the target constant data may be a constant, or may be an address in the memory.

Step 502: Insert a plurality of data transfer instructions into the first code based on a location of the objective function in the first code to obtain second code, where the second code is labeled as being stored into a storage area having no read permission.

In this embodiment, after determining the target constant data to be accessed in the first code, the compiler further determines the objective function that is in the first code and that needs to access the target constant data such as to insert the plurality of data transfer instructions into the first code.

The objective function is a function that needs to access the target constant data. Each data transfer instruction in the plurality of data transfer instructions includes a part of data in the target constant data, and the plurality of data transfer instructions are used to write the target constant data into the register. Further, each data transfer instruction in the plurality of data transfer instructions is used to write data carried in the data transfer instruction into the register. For example, the plurality of data transfer instructions may all be move instructions. Because each data transfer instruction in the plurality of data transfer instructions carries a part of data in the target constant data, after the plurality of data transfer instructions are sequentially executed, each data transfer instruction writes the part of data carried in the data transfer instruction into the register such that the register can finally store the target constant data.

For example, the plurality of data transfer instructions includes a first data transfer instruction and a second data transfer instruction, the first data transfer instruction includes a first part of data in the target constant data, and the second data transfer instruction includes a second part of data in the target constant data. In addition, the first part of data and the second part of data do not coincide, and the target constant data includes the first part of data and the second part of data. For example, the first part of data is the first half of the target constant data, and the second part of data is the second half of the target constant data. The first data transfer instruction is used to write the first part of data into the register, and the second data transfer instruction is used to write the second part of data into the register. In this way, when sequentially executing the first data transfer instruction and the second data transfer instruction, a processor may first write the first part of data into the register, and then write the second part of data into the register such that the register stores complete target constant data.

Further, the compiler may insert the plurality of data transfer instructions before an instruction that is in the first code and that instructs the objective function to use the target constant data, to ensure that the objective function can perform a normal processing operation based on the obtained target constant data. For example, the compiler may insert the plurality of data transfer instructions at an entrance of the objective function in the first code.

In addition, the second code obtained by inserting the plurality of data transfer instructions into the first code by using the compiler is labeled as being stored into the storage area having no read permission. In this way, when obtaining a program executable file corresponding to the second code through linking, a linker may designate that a permission of the program executable file is executable only but not readable such that the operating system loads the program executable file to a memory segment that is executable only but not readable, thereby implementing security protection of the program code. The second code is labeled as being stored into the storage area having no read permission such that an attacker can be prevented from maliciously reading the program code, security of the computer system can be effectively ensured, and leakage of key logic of the program code can be avoided.

It may be understood that, in a process in which the processor executes the literal pool reference instruction and the literal pool instruction, the processor writes, from the memory into the register by executing the literal pool reference instruction, the constant data included in the literal pool instruction. When executing the plurality of data transfer instructions, the processor directly writes the data carried in each of the plurality of data transfer instructions into the register such that the register can include the foregoing target constant data. Therefore, effect of executing the plurality of data transfer instructions by the processor is the same as effect of executing the literal pool reference instruction and the literal pool instruction by the processor.

In other words, normal execution of the program is not affected through replacement of the literal pool reference instruction and the literal pool instruction with the plurality of data transfer instructions. In addition, because the processor can write the target constant data into the register by executing the plurality of data transfer instructions, the program code does not need to be read, and it is ensured that the read permission does not need to be set for the finally obtained second code.

It should be noted that, in a process in which the compiler generates the intermediate code, because the compiler usually stores the constant data in the program source code in another manner, the first code actually does not include specific constant data. Therefore, in comparison with inserting the literal pool instruction and the literal pool reference instruction into the intermediate code in an existing compilation procedure, in this embodiment, the plurality of data transfer instructions equivalent to the literal pool instruction and the literal pool reference instruction are inserted into the first code. In a process of executing the plurality of data transfer instructions, because the processor can directly write target constant data jointly carried in the plurality of data transfer instructions into the register, code reading can be avoided such that it is ensured that the read permission does not need to be set for the finally obtained second code.

In some cases, the target constant data to be accessed in the first code may be floating-point data (or a floating-point number). The floating-point number is a computer number representation method. The floating-point number uses an exponent to enable a location of a decimal point to float up or down as required such that a larger range of real numbers can be flexibly expressed. In the computer system, when processing the floating-point number, the processor usually needs to write the floating-point number from the memory into a dedicated register, that is, write the floating-point number into the floating-point register. Therefore, to ensure that the floating-point number can be written into the floating-point register, the compiler may further insert a new data transfer instruction into the first code, to write the floating-point number from a general-purpose register to the floating-point register.

In a possible embodiment, the data processing method 500 further includes: if the target constant data is floating-point data, inserting a third data transfer instruction into the first code. The third data transfer instruction is located after the plurality of data transfer instructions, the plurality of data transfer instructions is used to write the target constant data into the general-purpose register, and the third data transfer instruction is used to write the target constant data written into the general-purpose register into the floating-point register.

For example, the plurality of data transfer instructions may be move instructions, and the move instruction instructs to write data carried in the move instruction into the general-purpose register. The third data transfer instruction may be a vmove instruction, and the vmove instruction instructs to write data in the general-purpose register into the floating-point register. Therefore, the third data transfer instruction is inserted after the plurality of data transfer instructions such that when executing the first code, the processor may first write the target constant data into the general-purpose register based on the plurality of data transfer instructions, and then write the target constant data from the general-purpose register to the floating-point register based on the third data transfer instruction.

The third data transfer instruction that instructs to write the target constant data of the general-purpose register into the floating-point register is inserted after the plurality of data transfer instructions such that it can be ensured that the floating-point number to be accessed in the first code can be normally written into the floating-point register, thereby ensuring normal running of the program.

In a possible embodiment, the inserting the plurality of data transfer instructions into the first code may further include the following step 5021 to step 5023.

Step 5021: If the target constant data is address type data, insert the plurality of data transfer instructions into the first code, and add a label to the plurality of data transfer instructions, where the label indicates that data transferred by the plurality of data transfer instructions is the address type data.

In this embodiment, the plurality of data transfer instructions is inserted into the first code by the compiler in a compilation phase. However, when the target constant data is the address type data, a value of the target constant data (that is, a target address) can be determined only in a link phase. That is, the compiler cannot obtain the value of the target constant data in the compilation phase. In this case, the compiler may insert the plurality of data transfer instructions into the first code. The data transfer instruction does not carry a specific value of the target constant data.

Generally, an instruction includes operation code and address code. The operation code indicates a type or a property of an operation to be completed by the instruction, for example, data fetching, addition, or data outputting. The address code indicates content of an operation object or an address of a storage unit in which the operation object is located. Therefore, when the target constant data is the address type data, the plurality of data transfer instructions inserted by the compiler into the first code may include only the operation code, and the address code in the plurality of data transfer instructions may be empty (0x000000) such that the linker subsequently fills in a specific value in the link phase.

For example, an instruction in the first code needs to use a global variable, and an address of the global variable is the target constant data in the first code. The compiler needs to carry the address of the global variable by using the plurality of data transfer instructions. However, the address of the global variable can be determined only in the link phase. Therefore, the compiler cannot obtain the address of the global variable in a current compilation phase. The compiler inserts, into the first code, the plurality of data transfer instructions including only the operation code, and adds the label for the plurality of data transfer instructions such that the linker can subsequently fill in specific address data for the plurality of data transfer instructions.

After inserting the plurality of data transfer instructions into the first code, the compiler adds the label for the plurality of data transfer instructions, where the label indicates that the data transferred by the plurality of data transfer instructions is the address type data. Simply speaking, the label indicates that the plurality of data transfer instructions are instructions for transferring addresses, and the label instructs an assembler to generate relocation information in an assembly phase.

Step 5022: Generate the relocation information based on the label, where the relocation information indicates locations of the plurality of data transfer instructions in the first code.

In the assembly phase, the assembler generates the relocation information based on the label generated by the compiler. The relocation information indicates locations of the plurality of data transfer instructions in code of an object file. Further, the relocation information records location information, and the location information indicates a location of address data that cannot be determined in the program code in a current phase. Generally, the relocation information further records relocation types, and different relocation types correspond to different types of address information and addressing modes.

Step 5023: Fill a part of data in the target constant data into each of the plurality of data transfer instructions based on the relocation information.

In the link phase, the linker may determine the value of the target constant data based on the relocation information generated by the assembler, that is, determine the address data that needs to be filled in the plurality of data transfer instructions. Then, the linker fills the part of data in the target constant data into each of the plurality of data transfer instructions based on the location indicated in the relocation information.

For example, the plurality of data transfer instructions includes the first data transfer instruction and the second data transfer instruction in total, and the value that is of the target constant data and that is determined by the linker is a 32-bit address. In this case, the linker may fill the first 16 bits of the 32-bit address in the first data transfer instruction, and fill the last 16 bits of the 32-bit address in the second data transfer instruction.

Figure 6:
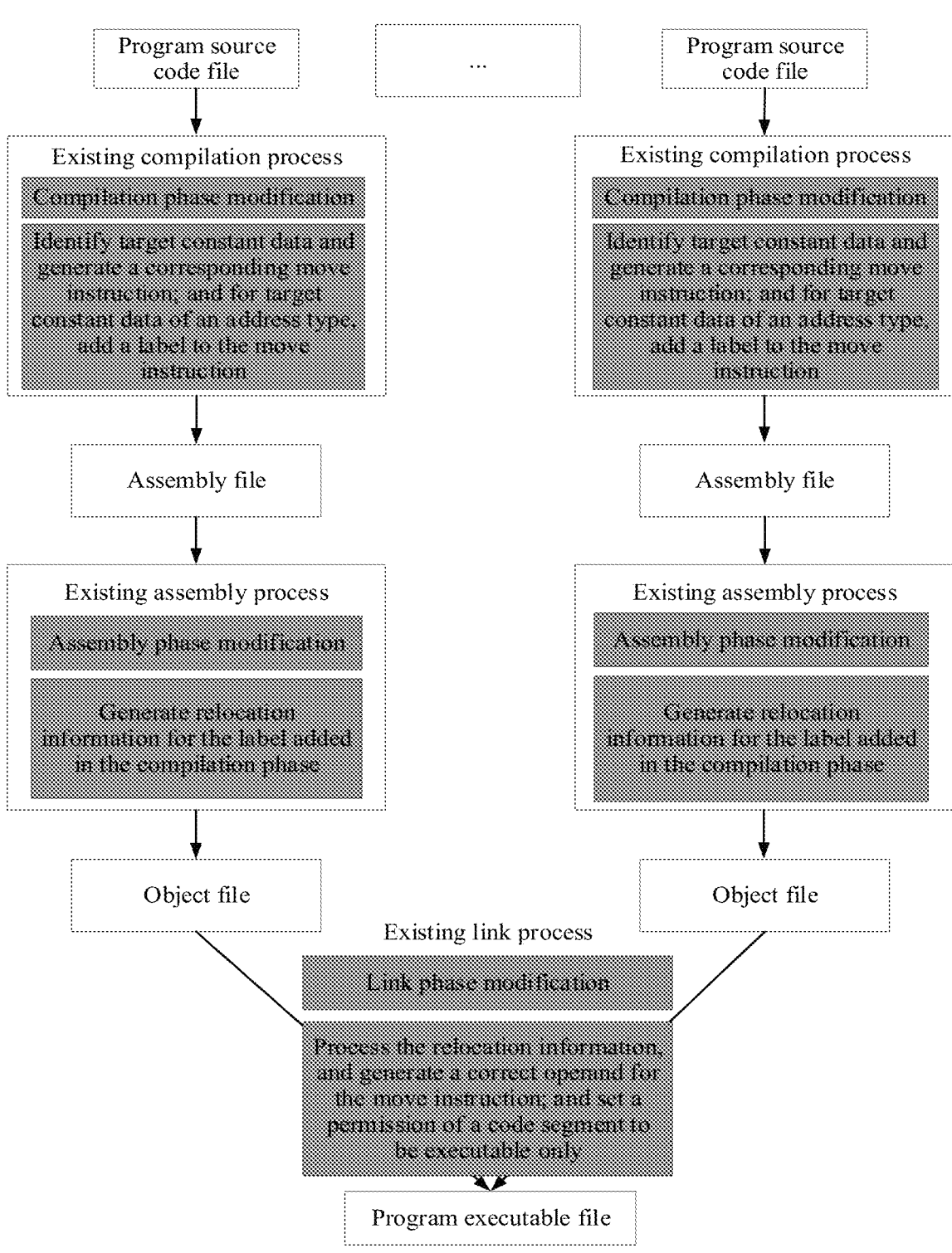
FIG. 6 is a schematic flowchart of improved program construction according to an embodiment of this application.

FIG. 6 is a schematic flowchart of improved program construction according to an embodiment of this application. As shown in FIG. 6, in this embodiment, the compilation phase, the assembly phase, and the link phase in the program construction process are all improved.

Further, in the compilation phase, the compiler first compiles the program source code file based on an existing compilation procedure, to obtain intermediate code. The literal pool instruction and the literal pool reference instruction are not generated in the intermediate code. Then, the compiler identifies target constant data in the intermediate code and generates a plurality of corresponding move instructions. Each of the plurality of move instructions carries a part of data in the target constant data. The plurality of move instructions are separately used to write carried data into a general-purpose register, to write the target constant data into the register. For target constant data of a floating-point type (that is, the target constant data is a floating-point number), the compiler inserts a vmove instruction after the plurality of move instructions. The vmove instruction instructs to write the target constant data in the general-purpose register into a floating-point register. For target constant data of an address type (that is, the target constant data is an address), the compiler adds a label to the plurality of move instructions, to indicate that data transferred by the plurality of move instructions is the address type data.

In the assembly phase, the assembler assembles, based on an existing assembly procedure, an assembly file obtained in the compilation phase. In addition, the assembler generates corresponding relocation information for the label added in the compilation phase, to indicate a plurality of locations of the plurality of move instructions in the code.

In the link phase, the linker may link, based on an existing link procedure, a plurality of object files obtained in the assembly phase. In addition, the linker processes the relocation information generated in the assembly phase, and generates correct operands for the plurality of move instructions, that is, generates correct target constant data. The linker divides the generated target constant data into a plurality of parts, and respectively fills the plurality of parts of the target constant data into the plurality of move instructions. Finally, the linker sets permissions of code segments in which the plurality of move instructions are located to be executable only but not readable, to obtain a final program executable file.

For example, the operating system is an ARM architecture-based operating system. The compiler used in the program construction process shown in FIG. 6 may be a compiler in a GNU compiler collection (GCC). Modification procedures in the compilation phase are integrated into a GCC plug-in, and modification procedures in the assembly phase are integrated into a GCC assembler plug-in.

In addition, move instructions in the ARM architecture may be a movw-movt instruction pair. The movw instruction can write a 16-bit immediate operand into lower 16 bits of a specific general-purpose register, and the movt instruction can write a 16-bit immediate into upper 16 bits of the specific general-purpose register. Based on the movw-movt instruction pair, a 32-bit (that is, four-byte) immediate can be written into the specific general-purpose register.

FIG. 7 is a schematic flowchart of a data processing method 700 according to an embodiment of this application. As shown in FIG. 7, the data processing method 700 includes the following steps 701 to 704.

Step 701: Obtain target constant data to be accessed in first code, where a length of the target constant data is greater than a preset threshold.

In this embodiment, step 701 is similar to step 501. For details, refer to the descriptions of step 501. Details are not described herein again.

Step 702: Generate a literal pool instruction and a literal pool reference instruction based on a location of an objective function in the first code.

In this embodiment, after determining the target constant data to be accessed in the first code, a compiler further determines the objective function that is in the first code and that needs to access the target constant data. The objective function is a function that needs to access the target constant data.

Then, the compiler may generate the literal pool instruction and the literal pool reference instruction based on an existing compilation procedure. The literal pool instruction includes the target constant data, and the literal pool reference instruction is used to access the target constant data in the literal pool instruction.

Optionally, because when generating the literal pool instruction and the literal pool reference instruction, the compiler usually inserts the literal pool instruction at an end location of the objective function, and inserts the literal pool reference instruction at a middle location of the objective function, the compiler may further adjust a location of the literal pool instruction. In other words, in the first code, the literal pool instruction and the literal pool reference instruction are not consecutive, and there is another instruction between the literal pool instruction and the literal pool reference instruction.

Therefore, in this embodiment, after generating the literal pool instruction and the literal pool reference instruction, the compiler may further adjust the location of the literal pool instruction in the first code such that the literal pool instruction is located after the literal pool reference instruction. After the compiler adjusts the location of the literal pool instruction, the literal pool reference instruction and the literal pool instruction are two consecutive instructions in the first code.

Step 703: Record location information of the literal pool instruction and the literal pool reference instruction.

Further, when generating the literal pool instruction and the literal pool reference instruction, the compiler may perform instruction scanning on the first code, and record the location information of the identified literal pool instruction and literal pool reference instruction. Then, the compiler outputs the location information obtained through recording to a separate program segment such that the program segment that is dedicated to storing the location information can be deleted subsequently.

For example, the compiler may insert a label class instruction at each literal pool instruction. The label class instruction indicates a location in which the literal pool instruction is located. The compiler then generates a label reference instruction (label ref) for each label class instruction. After linking is completed, the label reference instruction is converted by the linker into an address corresponding to the literal pool instruction such that a binary rewriter obtains the location information of the literal pool instruction and the literal pool reference instruction. In addition, after generating label reference instructions, the compiler designates that all the label reference instructions are output to a separate program segment such that a label reference instruction unrelated to program code content can be quickly deleted subsequently.

Step 704: Replace the literal pool instruction and the literal pool reference instruction with the plurality of data transfer instructions based on the location information, to obtain second code.

After the compiler adjusts the location of the literal pool instruction in the first code, the binary rewriter may replace, based on the location information of the literal pool instruction and the literal pool reference instruction, the consecutive literal pool instruction and literal pool reference instruction with the plurality of data transfer instructions. To be specific, the binary rewriter deletes the original literal pool instruction and literal pool reference instruction from the program code, and inserts the plurality of data transfer instructions at deletion locations. The binary rewriter may perform binary rewriting on the code in a program executable file obtained through linking by the linker such as to replace the literal pool instruction and the literal pool reference instruction that are consecutive with the plurality of data transfer instructions. In this embodiment, the binary rewriter is configured to perform rewriting and replacement on the code. To be specific, the binary rewriter replaces a specific literal pool instruction and a specific literal pool reference instruction with the plurality of data transfer instructions.

For example, when the compiler generates a label reference instruction for each label class instruction, the linker may convert the label reference instruction into the address corresponding to the literal pool instruction such that the binary rewriter obtains the location information of the literal pool instruction and the literal pool reference instruction. After the literal pool instruction and the literal pool reference instruction are replaced with the plurality of data transfer instructions, the binary rewriter may delete the separate program segment in which the label reference instruction is located, that is, delete the location information of the literal pool instruction and the literal pool reference instruction such as to reduce a data amount of the final program executable file.

In addition, when obtaining a program executable file corresponding to the second code through linking, the linker may designate that a permission of the program executable file is executable only but not readable such that the operating system loads the program executable file to a memory segment that is executable only but not readable, thereby implementing security protection of the program code. The second code is labeled as being stored into a storage area having no read permission such that an attacker can be prevented from maliciously reading the program code, security of the computer system can be effectively ensured, and leakage of key logic of the program code can be avoided.

In a possible embodiment, before step 702, if the target constant data is a floating-point number that needs to be stored through a floating-point register, the compiler may designate that the target constant data is output to a read-only data segment, and designate an address of the target constant data in the read-only data segment as data stored in the literal pool instruction. In this way, the compiler may convert a floating-point number stored in the literal pool instruction into an address of the floating-point number, that is, convert access to the floating-point number in the literal pool instruction into access to the address that is in the read-only data segment and that stores the floating-point number. Because the data stored in the literal pool instruction is converted into the address of the read-only data segment, and the address is integer type data, the move instruction can be directly used to replace the literal pool instruction. In addition, because the target constant data is output to the read-only data segment, an objective of accessing the target constant data can also be achieved through access to the address that is in the read-only data segment and that stores the target constant data, and normal running of the program is not affected.

Figure 8:
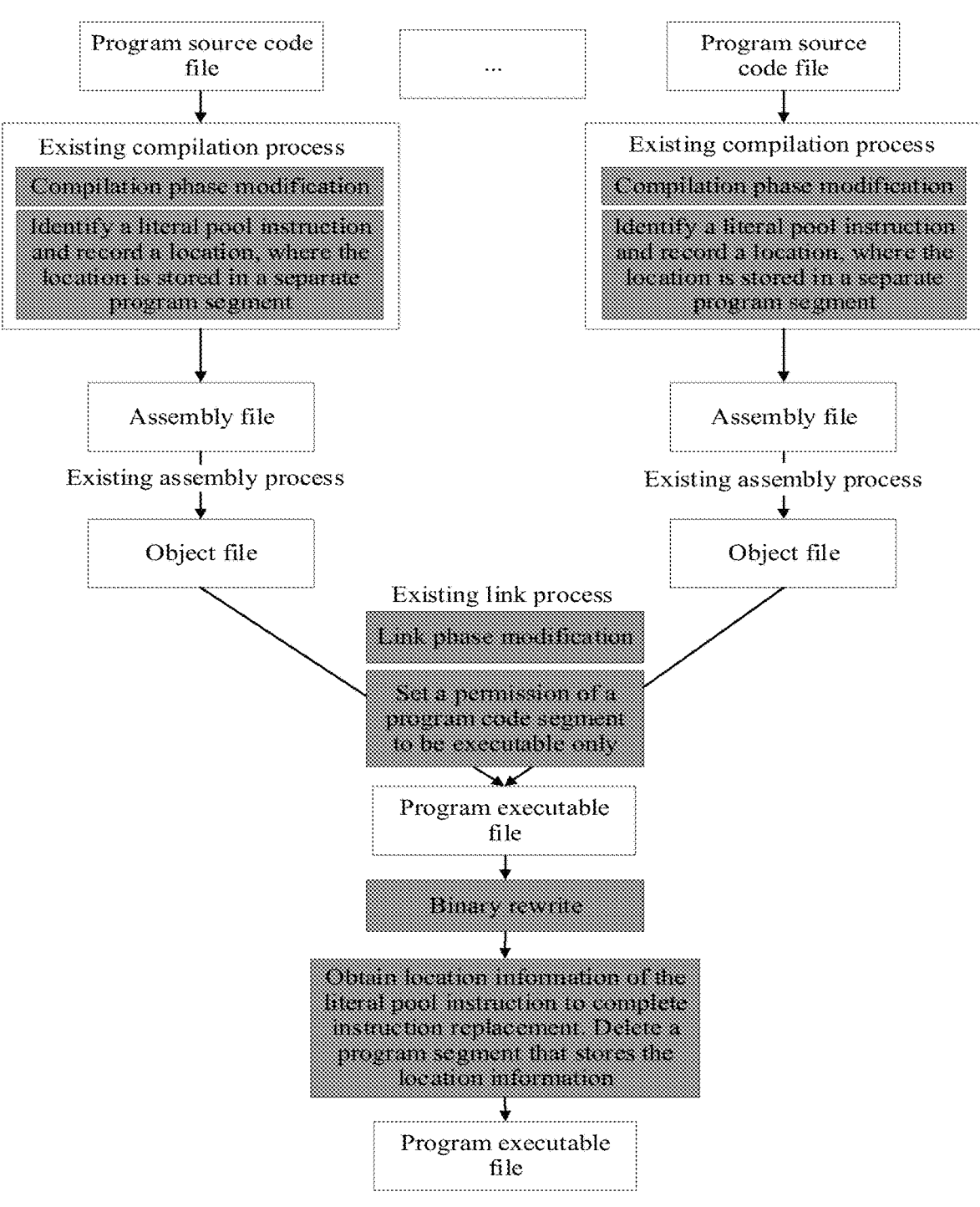
FIG. 8 is a schematic flowchart of other improved program construction according to an embodiment of this application.

FIG. 8 is a schematic flowchart of other improved program construction according to an embodiment of this application. As shown in FIG. 8, in this embodiment, the compilation phase, the assembly phase, and the link phase in the program construction process are all improved.

Further, in the compilation phase, the compiler first compiles the program source code file based on an existing compilation procedure, to obtain intermediate code in which the literal pool instruction and the literal pool reference instruction have been generated. Then, the compiler adjusts the location of the literal pool instruction in the intermediate code such that the literal pool instruction is located after the literal pool reference instruction. In addition, the compiler records location information of the literal pool instruction, and stores the location information into a separate program segment.

In the assembly phase, the assembler assembles, based on an existing assembly procedure, an assembly file obtained in the compilation phase, to obtain an object file.

In the link phase, the linker may link, based on an existing link procedure, a plurality of object files obtained in the assembly phase. In addition, the linker sets the permission of the program code segment to be executable only but not readable such as to obtain the program executable file. The program code segment in the program executable file has only an execution permission but does not have a read permission.

After a link process is completed, the binary rewriter obtains, based on the location information recorded by the compiler, a location of the literal pool instruction in the program executable file, and replaces the literal pool instruction and the literal pool reference instruction with the plurality of move instructions, to complete instruction replacement. In addition, the binary rewriter deletes the program segment that stores the location information of the literal pool instruction, to obtain the final program executable file. In the program executable file, access to the target constant data is implemented through the plurality of move instructions.

Figure 9:
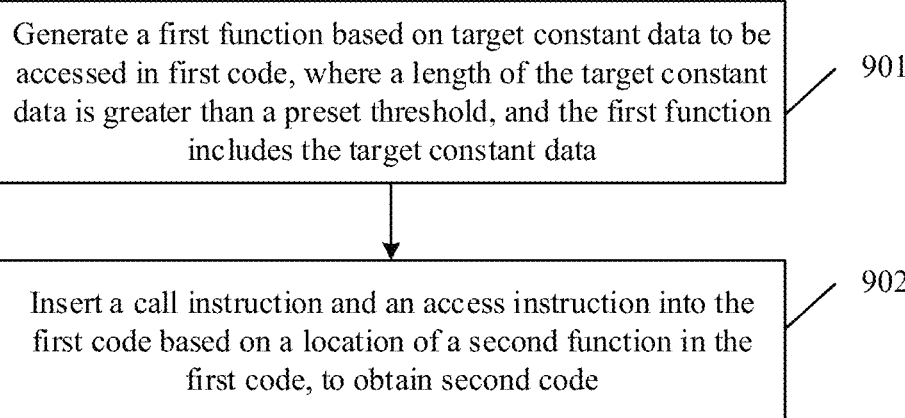
FIG. 9 is a schematic flowchart of a data processing method 900 according to an embodiment of this application.

FIG. 9 is a schematic flowchart of a data processing method 900 according to an embodiment of this application. As shown in FIG. 9, the data processing method 900 includes the following steps 901 and 902.

Step 901: Generate a first function based on target constant data to be accessed in first code, where a length of the target constant data is greater than a preset threshold, and the first function includes the target constant data.

In this embodiment, the first code may be intermediate code obtained by compiling a program source code file by using a compiler. In the first code, the compiler has not generated a literal pool instruction and a literal pool reference instruction. The target constant data to be accessed in the first code, that is, the target constant data that needs to be accessed by a function in the first code may be determined through instruction scanning on the first code. The target constant data is constant data that needs to be accessed in a literal pool manner in a conventional compilation process. A length of the target constant data is greater than a preset threshold, and the preset threshold may be a value such as two bytes or four bytes. The value of the preset threshold may be determined based on an actual compilation requirement. A specific value of the preset threshold is not limited in this embodiment.

Optionally, the target constant data in the first code may include one or more of an integer constant, a floating-point constant, an address of a static symbol, an address of a global symbol, and an address of a thread local storage symbol. In other words, the target constant data may be a constant, or may be an address in a memory.

After determining the target constant data to be accessed in the first code, the compiler may generate the corresponding first function based on the target constant data, and add the obtained target constant data to the first function. The first function includes the target constant data, and the first function can return an address of the target constant data when being called.

Step 902: Insert a call instruction and an access instruction into the first code based on a location of a second function in the first code to obtain second code.

The second function is a function that needs to access the target constant data, the call instruction instructs to call the first function, the first function is used to return the address of the target constant data, and the access instruction instructs to access the target constant data based on the address returned by the first function.

Further, the compiler may insert the call instruction and the access instruction before an instruction that is in the first code and that instructs the second function to use the target constant data, to ensure that the second function can perform a normal processing operation based on the obtained target constant data. For example, the compiler may insert the call instruction at an entrance of the second function in the first code, and insert the access instruction before the instruction for using the target constant data.

Simply speaking, the first code includes the second function that needs to access the target constant data, and the compiler may insert the call instruction and the access instruction before an instruction that is in the second function and that instructs to use the target constant data. In this way, during execution of a program, a processor can call the first function by executing the call instruction such as to obtain the address that is of the target constant data and that is returned by the first function. Then the processor accesses the target constant data based on the address that is of the target constant data and that is returned by the first function by executing the access instruction such that the target constant data can be used in another instruction of the second function subsequently.

In addition, the second code is labeled as being stored into a storage area having no read permission, and the first function is labeled as being stored into a storage area having the read permission. Further, the compiler may generate two code segments in a compilation process. One code segment stores the second code, and the other code segment stores the first function. In addition, the compiler may designate that a permission of the code segment that stores the second code is executable only but not readable, and designate that a permission of the code segment that stores the first function is executable and readable. In this way, after the compiler separately designates the permission of the code segment in which the second code is located and the permission of the code segment in which the first function is located, a linker may set, based on the permissions designated by the compiler, a permission of each program segment in a final program executable file such as to ensure that the second code is stored into the storage area having no read permission, and the first function is stored into the storage area having the read permission.

For example, after the compiler separately designates the permission of the code segment in which the second code is located and the permission of the code segment in which the first function is located, the linker may generate an executable file based on the permissions designated by the compiler, the second code, and the first function. The second code is located in a first program segment of the executable file, and the first function is located in a second program segment of the executable file. A running permission of the first program segment does not include the read permission, and a running permission of the second program segment includes the read permission. In this way, when loading the executable file of the program to the memory, the operating system loads the first program segment to a memory segment having no read permission, and loads the second program segment to a memory segment having the read permission.

For example, in a compilation phase, the second code and the first function are respectively stored in different sections of a program executable and linkable format (ELF) file. The section in which the second code is located is designated as having only the execution permission, and the section in which the first function is located is designated as having the execution permission and the read permission. Finally, in a link phase, the linker outputs the section in which the second code is located into a segment, and a permission of the segment in which the second code is located is configured to be executable only. The linker outputs the section in which the first function is located into a segment, and a permission of the segment in which the first function is located is configured to be executable and readable.

Generally, a syntax keyword section commonly indicates an area in the compilation process. The section is a pseudo-instruction provided by the compiler. An area is logically planned in the program, and this area is the section. In the link phase, the linker combines sections that have same attributes and that are in an object file into a large section set. This set is referred to as a segment, that is, a segment. The segment may be generally understood as the code segment and the data segment of the executable file in memory space.

In this embodiment, the call instruction of the function including the target constant data is inserted into the code, and the function including the target constant data is stored in a separate program segment such that a finally generated program code segment does not include specific constant data. Therefore, the finally generated program code segment may be stored into the storage area having no read permission such as to prevent an attacker from maliciously reading the program code, thereby effectively ensuring security of the computer system and avoiding leakage of key logic of the program code.

Optionally, the first function is used to return a base address of the target constant data, the access instruction includes an address offset, and the access instruction instructs to access the target constant data based on the base address and the address offset.

It may be understood that the first function may include a plurality of pieces of constant data, and the plurality of pieces of constant data include the foregoing target constant data. In addition, the plurality of pieces of constant data are sequentially stored in one memory segment, the first function may return a start address of the memory segment storing the plurality of pieces of constant data, and the start address of the memory segment is the base address of the target constant data. Then, the compiler may determine, based on a location of the target constant data in the plurality of pieces of constant data included in the first function, the address offset of the target constant data relative to the start address in the memory segment. Therefore, the compiler may insert the access instruction including the address offset into the first code.

In this way, after executing the call instruction, the processor obtains the base address that is of the target constant data and that is returned by the first function. The processor may allocate a general-purpose register to store the base address, and the general-purpose register is used by a base address register to complete access to constant data in a subsequent procedure. Then, based on the address offset in the access instruction and the base address returned by the first function, the processor may obtain the target constant data through access.

Figure 10:
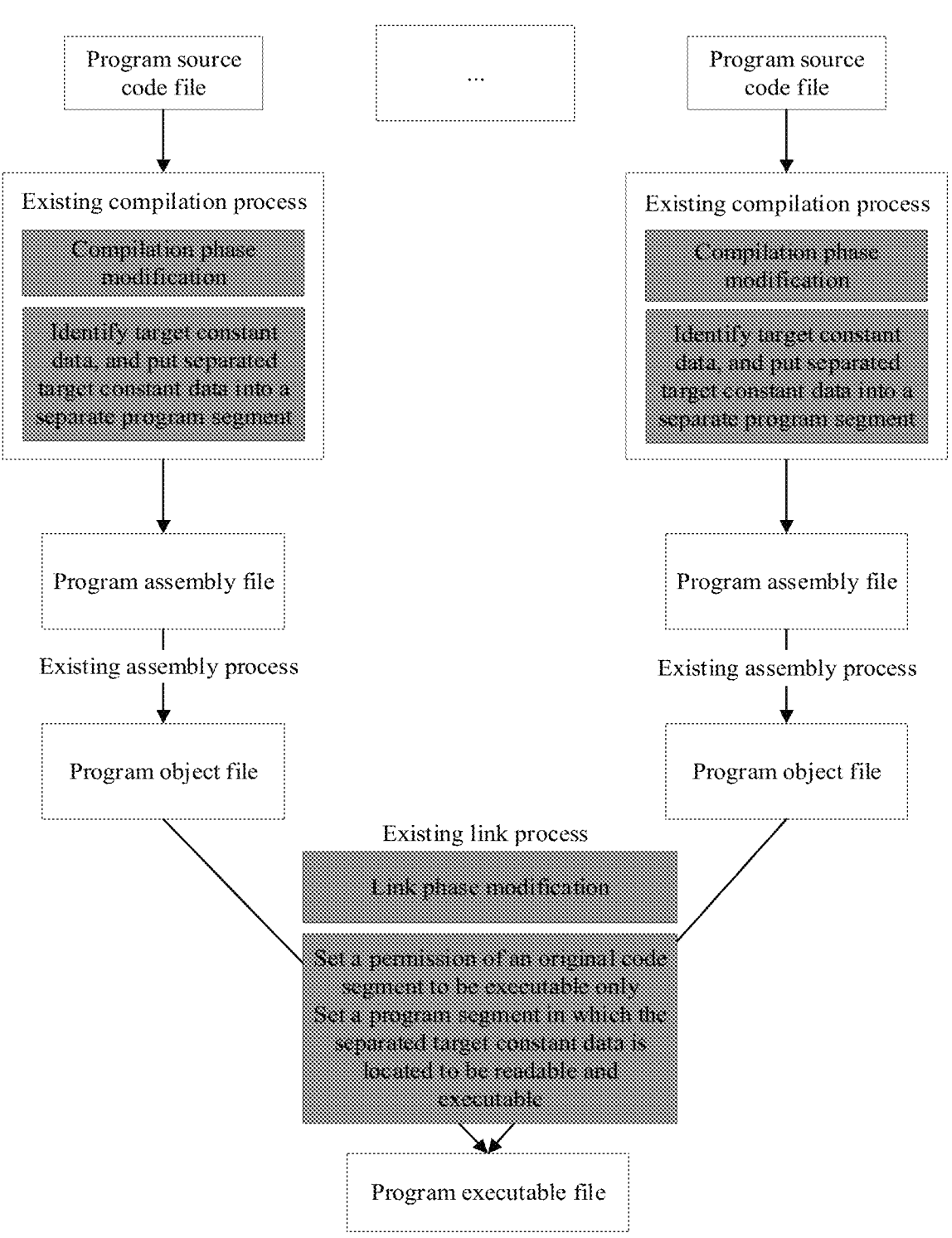
FIG. 10 is a schematic flowchart of other improved program construction according to an embodiment of this application.

FIG. 10 is a schematic flowchart of other improved program construction according to an embodiment of this application. As shown in FIG. 10, in this embodiment, the compilation phase, the assembly phase, and the link phase in the program construction process are all improved.

Further, in the compilation phase, the compiler first compiles the program source code file based on an existing compilation procedure, to obtain intermediate code in which the literal pool instruction and the literal pool reference instruction are not generated. Then, the compiler generates a static function including target constant data (that is, constant data that needs to be stored in the literal pool manner). The static function can return an address of the target constant data. In addition, the compiler inserts a call instruction and an access instruction of the static function into the intermediate code, to access the target constant data based on the address returned by the static function. In addition, the compiler isolates the static function from the intermediate code, that is, designates that the static function and the intermediate code are stored in different program segments.

In the assembly phase, the assembler assembles, based on an existing assembly procedure, an assembly file obtained in the compilation phase, to obtain an object file.

In the link phase, the linker may link, based on an existing link procedure, a plurality of object files obtained in the assembly phase. In addition, the linker sets a permission of a program segment in which original code is located (that is, a code segment that does not include the static function) to be executable only but not readable, and sets a permission of a program segment in which the static function is located to be executable and readable such as to obtain a program executable file. In the program executable file, the permission of the program segment in which the original code is located is executable only but not readable, and the permission of the program segment in which the static function is located is executable and readable.

In this way, when the operating system loads the program executable file, the program segment in which the original code is located is loaded to a memory segment having only the execution permission, and the program segment in which the static function is located is loaded to a memory segment having the execution permission and the read permission.

Based on the embodiments corresponding to FIG. 1 to FIG. 10, to better implement the foregoing solutions in embodiments of this application, the following further provides related devices configured to implement the foregoing solutions.

Figure 11:
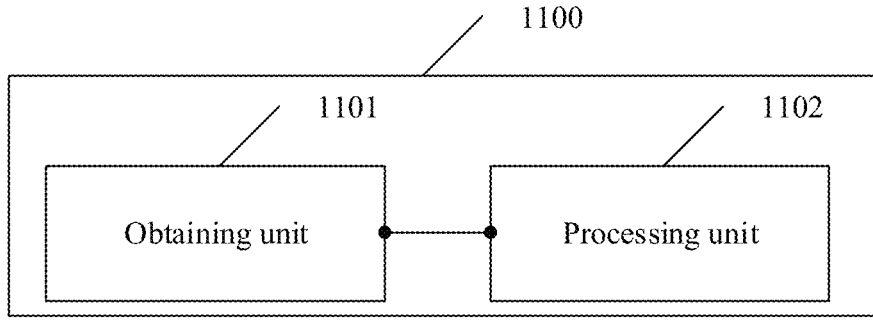
FIG. 11 is a schematic diagram of a structure of an electronic device 1100 according to an embodiment of this application.

FIG. 11 is a schematic diagram of a structure of an electronic device 1100 according to an embodiment of this application. The electronic device 1100 includes an obtaining unit 1101 and a processing unit 1102. The obtaining unit 1101 is configured to obtain target constant data to be accessed in first code, where a length of the target constant data is greater than a preset threshold. The processing unit 1102 is configured to insert a plurality of data transfer instructions into the first code based on a location of the objective function in the first code, to obtain second code, where the objective function is a function that needs to access the target constant data, each data transfer instruction of the plurality of data transfer instructions includes a part of data in the target constant data, the plurality of data transfer instructions are used to write the target constant data into a register, and the second code is labeled as being stored into a storage area having no read permission.

In a possible implementation, the plurality of data transfer instructions include a first data transfer instruction and a second data transfer instruction, the first data transfer instruction includes a first part of data in the target constant data, the first data transfer instruction is used to write the first part of data into the register, the second data transfer instruction includes a second part of data in the target constant data, the second data transfer instruction is used to write the second part of data into the register, and the first part of data and the second part of data do not coincide.

In a possible implementation, the processing unit 1102 is further configured to: if the target constant data is floating-point data, insert a third data transfer instruction into the first code, where the third data transfer instruction is located after the plurality of data transfer instructions, the plurality of data transfer instructions are used to write the target constant data into a general-purpose register, and the third data transfer instruction is used to write the target constant data written into the general-purpose register into a floating-point register.

In a possible implementation, the processing unit 1102 is further configured to: if the target constant data is address type data, insert the plurality of data transfer instructions into the first code, and add a label to the plurality of data transfer instructions, where the label indicates that data transferred by the plurality of data transfer instructions is the address type data. The processing unit 1102 is further configured to generate relocation information based on the label, where the relocation information indicates locations of the plurality of data transfer instructions in the first code. The processing unit 1102 is further configured to fill, in each of the plurality of data transfer instructions, the part of data in the target constant data based on the relocation information.

In a possible implementation, the processing unit 1102 is further configured to generate a literal pool instruction and a literal pool reference instruction based on the location of the objective function in the first code, where the literal pool instruction includes the target constant data, and the literal pool reference instruction is used to access the target constant data in the literal pool instruction. The processing unit 1102 is further configured to record location information of the literal pool instruction and the literal pool reference instruction. The processing unit 1102 is further configured to replace the literal pool instruction and the literal pool reference instruction with the plurality of data transfer instructions based on the location information.

In a possible implementation, the processing unit 1102 is further configured to adjust a location of the literal pool instruction in the first code such that the literal pool instruction is located after the literal pool reference instruction.

In a possible implementation, the target constant data includes one or more of an integer constant, a floating-point constant, an address of a static symbol, an address of a global symbol, and an address of a thread local storage symbol.

Figure 12:
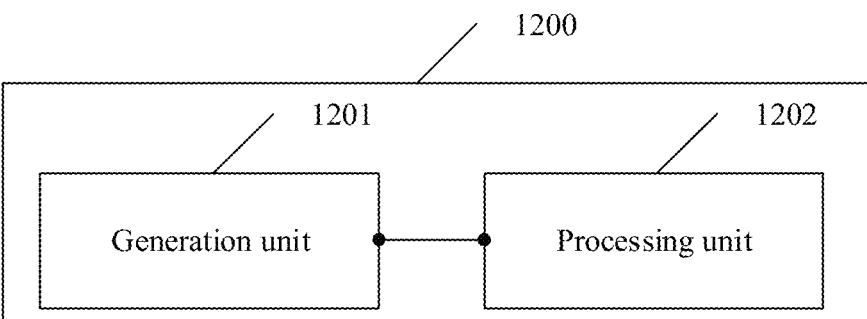
FIG. 12 is a schematic diagram of a structure of an electronic device 1200 according to an embodiment of this application.

FIG. 12 is a schematic diagram of a structure of an electronic device 1200 according to an embodiment of this application. The electronic device 1200 includes a generation unit 1201 and a processing unit 1202. The generation unit 1201 is configured to generate a first function based on target constant data to be accessed in first code, where a length of the target constant data is greater than a preset threshold, and the first function includes the target constant data. The processing unit 1202 is configured to insert a call instruction and an access instruction into the first code based on a location of a second function in the first code, to obtain second code, where the second function is a function that needs to access the target constant data, the call instruction instructs to call the first function, the first function is used to return an address of the target constant data, the access instruction instructs to access the target constant data based on the address returned by the first function, the second code is labeled as being stored into a storage area having no read permission, and the first function is labeled as being stored into a storage area having the read permission.

In a possible implementation, the first function is used to return a base address of the target constant data, the access instruction includes an address offset, and the access instruction instructs to access the target constant data based on the base address and the address offset.

In a possible implementation, the processing unit 1202 is further configured to generate an executable file based on the second code and the first function, where the second code is located in a first program segment of the executable file, the first function is located in a second program segment of the executable file, a running permission of the first program segment does not include the read permission, and a running permission of the second program segment includes the read permission.

In a possible implementation, the target constant data includes one or more of an integer constant, a floating-point constant, an address of a static symbol, an address of a global symbol, and an address of a thread local storage symbol.

The data processing method provided in embodiments of this application may be further performed by a chip in an electronic device. The chip includes a processing unit and a communication unit. The processing unit may be, for example, a processor, and the communication unit may be, for example, an input/output interface, a pin, or a circuit. The processing unit may execute computer-executable instructions stored in a storage unit such that the chip in the electronic device performs the data processing method described in the embodiments shown in FIG. 1 to FIG. 10. Optionally, the storage unit is a storage unit in the chip, such as a register or a cache. Alternatively, the storage unit may be a storage unit that is outside the chip and that is in a wireless access device end, such as a read-only memory (ROM) or another type of static storage device that can store static information and instructions, or a random-access memory (RAM).

Refer to FIG. 13. This application further provides a computer-readable storage medium. In some embodiments, the method disclosed in FIG. 5 may be implemented as computer program instructions encoded in a machine-readable format on the computer-readable storage medium or encoded on another non-transitory medium or product.

FIG. 13 schematically shows a conceptual partial view of an example computer-readable storage medium arranged according to at least some of embodiments shown herein. The example computer-readable storage medium includes a computer program for executing a computer process on a computing device.

In an embodiment, a computer-readable storage medium 1300 is provided through a signal carrying medium 1301. The signal carrying medium 1301 may include one or more program instructions 1302. When the one or more program instructions 1302 are run by one or more processors, functions or some of the functions described above in FIG. 5 may be provided. Therefore, for example, with reference to the embodiment shown in FIG. 5, one or more features of steps 501 and 502 may be borne by one or more instructions associated with the signal carrying medium 1301. In addition, a program instruction 1302 in FIG. 13 is also described as an example instruction.

In some examples, the signal carrying medium 1301 may include a computer-readable medium 1303, such as but not limited to a hard disk drive, a compact disk (CD), a DIGITAL VERSATILE DISC (DVD), a digital tape, a memory, a ROM, or a RAM.

In some implementations, the signal carrying medium 1301 may include a computer-recordable medium 1304, such as but not limited to a memory, a read/write (R/W) CD, or an R/W DVD. In some implementations, the signal carrying medium 1301 may include a communication medium 1305, such as but not limited to a digital and/or analog communication medium (for example, an optical fiber cable, a waveguide, a wired communication link, or a wireless communication link). Therefore, for example, the signal carrying medium 1301 may be conveyed by the communication medium 1305 (for example, a communication medium that complies with the Institute of Electrical and Electronics Engineers (IEEE) 802.13 standard or another transmission protocol) in a wireless form.

The one or more program instructions 1302 may be, for example, computer-executable instructions or logic implementation instructions. In some examples, a computing device may be configured to provide various operations, functions, or actions in response to the program instructions 1302 conveyed to the computing device through one or more of the computer-readable medium 1303, the computer-recordable medium 1304, and/or the communication medium 1305.

It should be understood that an arrangement described herein is merely used as an example. Therefore, it may be understood by a person skilled in the art that other arrangements and other elements (for example, machines, interfaces, functions, sequences, and functional groups) can be used instead, and that some elements may be omitted together based on an expected result. In addition, many of the described elements are functional entities that can be implemented as discrete or distributed components, or implemented in any suitable combination at any suitable location in combination with another component.

It may be clearly understood by a person skilled in the art that, for the purpose of convenient and brief description, for specific working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a ROM, a RAM, a magnetic disk, or an optical disc.

What is claimed is:

1. A method comprising:

obtaining target constant data to be accessed in a first code, wherein a length of the target constant data is greater than a preset threshold;

inserting, based on a first location of an objective function in the first code, a plurality of data transfer instructions into the first code to obtain a second code, wherein the objective function needs to access the target constant data, wherein each of the data transfer instructions comprises a first part of data in the target constant data, and wherein the data transfer instructions write the target constant data into a register; and labeling the second code as being stored into a storage area not having a read permission.

2. The method of claim 1, wherein the data transfer instructions comprise a first data transfer instruction and a second data transfer instruction, wherein the first data transfer instruction comprises a second part of the data and writes the second part into the register, wherein the second data transfer instruction comprises a third part of the data and writes the third part into the register, and wherein the second part and the third part do not coincide.

3. The method of claim 1, further comprising inserting a third data transfer instruction into the first code when the target constant data is floating-point data, wherein the third data transfer instruction is located after the data transfer instructions, wherein the data transfer instructions write the target constant data into a general-purpose register, and wherein the third data transfer instruction writes the target constant data in the general-purpose register into a floating-point register.

4. The method of claim 1, wherein inserting the data transfer instructions into the first code comprises:

inserting the data transfer instructions into the first code when the target constant data is address type data;

adding a label to the data transfer instructions when the target constant data is the address type data, wherein the label indicates that data transferred by the data transfer instructions is the address type data;

generating, based on the label, relocation information indicating locations of the data transfer instructions in the first code; and filling, in each of the data transfer instructions, the first part of the data in the target constant data based on the relocation information.

5. The method of claim 1, wherein inserting the data transfer instructions into the first code comprises:

generating a literal pool instruction and a literal pool reference instruction based on the first location of the objective function, wherein the literal pool instruction comprises the target constant data, and wherein the literal pool reference instruction accesses the target constant data in the literal pool instruction;

recording location information of the literal pool instruction and the literal pool reference instruction; and replacing the literal pool instruction and the literal pool reference instruction with the data transfer instructions based on the location information.

6. The method of claim 5, wherein before recording the location information, the method further comprises adjusting a second location of the literal pool instruction in the first code such that the literal pool instruction is after the literal pool reference instruction.

7. The method of claim 1, wherein the target constant data comprises one or more of an integer constant, a floating-point constant, an address of a static symbol, an address of a global symbol, or an address of a thread local storage symbol.

8. A method comprising:

generating a first function based on target constant data to be accessed in a first code, wherein a length of the target constant data is greater than a preset threshold, and wherein the first function comprises the target constant data;

inserting, based on a location of a second function in the first code, a call instruction and an access instruction into the first code to obtain second code, wherein the second function needs to access the target constant data, wherein the call instruction instructs to call the first function, wherein the first function returns an address of the target constant data in response to the call instruction, and wherein the access instruction instructs to access the target constant data based on the address;

label the second code as being stored into a first storage area not having a read permission; and label the first function as being stored into a second storage area having the read permission.

9. The method of claim 8, wherein the first function returns a base address of the target constant data, and wherein the access instruction comprises an address offset and instructs to access the target constant data based on the base address and the address offset.

10. The method of claim 8, further comprising generating an executable file based on the second code and the first function, wherein the second code is in a first program segment of the executable file, wherein the first function is in a second program segment of the executable file, wherein a first running permission of the first program segment does not comprise the read permission, and wherein a second running permission of the second program segment comprises the read permission.

11. The method of claim 8, wherein the target constant data comprises one or more of an integer constant, a floating-point constant, an address of a static symbol, an address of a global symbol, or an address of a thread local storage symbol.

12. An electronic device, comprising:

a memory configured to store instructions; and one or more processors coupled to the memory and configured to execute the instructions to cause the electronic device to:

obtain target constant data to be accessed in a first code, wherein a length of the target constant data is greater than a preset threshold;

insert, based on a first location of an objective function in the first code, a plurality of data transfer instructions into the first code to obtain a second code, wherein the objective function needs to access the target constant data, wherein each of the data transfer instructions comprises a first part of data in the target constant data, and wherein the data transfer instructions write the target constant data into a register; and label the second code as being stored into a storage area not having a read permission.

13. The electronic device of claim 12, wherein the data transfer instructions comprise a first data transfer instruction and a second data transfer instruction, wherein the first data transfer instruction comprises a second part of the data and writes the second part into the register, wherein the second data transfer instruction comprises a third part of the data and writes the third part into the register, and wherein the first part of data and the second part of data do not coincide.

14. The electronic device of claim 12, wherein the one or more processors are further configured to execute the instructions to cause the electronic device to insert a third data transfer instruction into the first code when the target constant data is floating-point data, wherein the third data transfer instruction is located after the data transfer instructions, wherein the data transfer instructions write the target constant data into a general-purpose register, and wherein the third data transfer instruction writes the target constant data in the general-purpose register into a floating-point register.

15. The electronic device of claim 12, wherein the one or more processors are further configured to execute the instructions to cause the electronic device to:

insert the data transfer instructions into the first code when the target constant data is address type data;

add a label to the plurality of data transfer instructions when the target constant data is address type data, wherein the label indicates that data is the address type data;

generate, based on the label, relocation information indicating locations of the data transfer instructions in the first code; and filling, in each of the data transfer instructions, the first part of the data in the target constant data based on the relocation information.

16. The electronic device of claim 12, wherein the one or more processors are further configured to execute the instructions to cause the electronic device to:

generate a literal pool instruction and a literal pool reference instruction based on the first location of the objective function, wherein the literal pool instruction comprises the target constant data, and wherein the literal pool reference instruction accesses the target constant data in the literal pool instruction;

record location information of the literal pool instruction and the literal pool reference instruction; and replace the literal pool instruction and the literal pool reference instruction with the data transfer instructions based on the location information.

17. The electronic device of claim 12, wherein the one or more processors are further configured to execute the instructions to cause the electronic device to adjust a second location of the literal pool instruction in the first code such that the literal pool instruction is after the literal pool reference instruction.

18. The electronic device of claim 12, wherein the target constant data comprises an integer constant or a floating-point constant.

19. The electronic device of claim 12, wherein the target constant data comprises an address of a static symbol or an address of a global symbol.

20. The electronic device of claim 12, wherein the target constant data comprises an address of a thread local storage symbol.

\* \* \* \* \*